(12) United States Patent
Kikushima

(10) Patent No.: US 7,444,084 B2
(45) Date of Patent: Oct. 28, 2008

(54) OPTICAL SIGNAL RECEIVER, OPTICAL SIGNAL RECEIVING EQUIPMENT, AND OPTICAL SIGNAL TRANSMITTING SYSTEM

(75) Inventor: Koji Kikushima, Ichikawa (JP)

(73) Assignee: Nippon Telegraph and Telephone Corporation (JP)

( * ) Notice: Subject to any disclaimer, the term of this patent is extended or adjusted under 35 U.S.C. 154(b) by 540 days.

(21) Appl. No.: 10/532,900

(22) PCT Filed: Sep. 3, 2004

(86) PCT No.: PCT/JP2004/012847

§ 371 (c)(1),
(2), (4) Date: Apr. 27, 2005

(87) PCT Pub. No.: WO2005/027380

PCT Pub. Date: Mar. 24, 2005

(65) Prior Publication Data

US 2006/0072876 A1    Apr. 6, 2006

(30) Foreign Application Priority Data

Sep. 8, 2003    (JP) ............................. 2003-315649

(51) Int. Cl.
*H04B 10/06* (2006.01)
(52) U.S. Cl. ..................................... 398/202
(58) Field of Classification Search ................. 398/161, 398/202–214
See application file for complete search history.

(56) References Cited

U.S. PATENT DOCUMENTS 2,881,312 A * 4/1959 Ressler ........................ 329/313
5,245,461 A * 9/1993 Fitzmartin ................... 398/214
5,896,216 A * 4/1999 Kikushima et al. .......... 398/176
6,556,327 B1    4/2003 Ohya et al.
2004/0218932 A1* 11/2004 Epworth et al. ............. 398/202

FOREIGN PATENT DOCUMENTS

EP    0 165 066 A2    12/1985

(Continued)

OTHER PUBLICATIONS

Koji Kikushima et.al., "Super-wide-band optical FM modulation scheme and its application to multichannel AM video transmission systems", IEEE Photonics Technology Letters, vol. 8, No. 6, Jun. 1996, 839-841.*

(Continued)

*Primary Examiner*—Shi K Li
(74) *Attorney, Agent, or Firm*—Fitch, Even, Tabin & Flannery

(57) ABSTRACT

The optical signal receiver of this invention is an optical signal receiver that receives and frequency-demodulates an optical signal, comprising: an optical branch device for splitting an input optical signal into two optical signals (13); an optical delay line for delaying one of the two branched optical signals (15); a first photoelectric conversion circuit (17) for converting the optical signal from the optical delay line into the first electrical signal (17); a second photoelectric conversion circuit (19) for converting the other optical signal of the two branched optical signals into a second electrical signal; the rectangular-wave forming circuit (21, 23, 25) for outputting a single rectangular-wave signal using the first electrical signal from the first photoelectric conversion circuit and the second electrical signal from the second photoelectric conversion circuit as inputs; and a smoothing circuit (12) for smoothing the rectangular-wave signal from the rectangular-wave forming circuit.

8 Claims, 22 Drawing Sheets

FOREIGN PATENT DOCUMENTS

| | | |
|---|---|---|
| EP | 0 314 197 A2 | 5/1989 |
| JP | 07-083763 | 3/1995 |
| JP | 09-326769 A | 12/1997 |
| JP | 2700622 | 1/1998 |
| JP | 2000-500923 | 1/2000 |
| JP | 2000-188515 A | 7/2000 |
| JP | 2001-119350 A | 4/2001 |
| JP | 2002-141750 | 5/2002 |
| JP | 3371355 | 11/2002 |
| WO | 97/19504 A1 | 5/1997 |

OTHER PUBLICATIONS

Koji Kikushima et.al., "A Super Wideband Optical FM Modulation Scheme for Video Transmission Systems", IEEE J. on Selected Areas in Communications, vol. 14, No. 6, Aug. 1996, 1066-1075.*

Transmission Equipment for transferring multi-channel television signals over optical access networks by FM conversion, ITU-T Standard J-185 (Feb. 2002).

Shibata, N. et al., Optical image distribution system using an FM batch conversion method, The IEICE Transaction B (Japanese Edition), vol. J83-B, No. 7, pp. 948-959, Jul. 2000.

Suzuki, et al., Pulsed FM batch conversion modulation analog optical CATV distribution method, IEICE Autumn Society Conference, Technical Digest, B-603, 1991.

Kikushima, Koji, et al., Distortions of Optical Video Transmission Systems Employing AM/FM Converters and its Countermeasures, The Institute of Electronics, Information and Communication Engineers, Technical Report of IEICE, vol. 96, No. 59, pp. 43-48, May 23, 1996.

Oka, Tatsuto et al.; A 1-5GHz Low-Power Single-Chip Receiver IC for Optical Video Distribution System, 2001 IEEE Radio Frequency Integrated circuits (RFIC) Symposium, Digest of Papers, Phoenix, AX, May 20-22, 2001, IEEE Radio Frequency Integrated Circuits Symposium, New York, NY: IEEE, US, May 20, 2001, pp. 199-202.

* cited by examiner

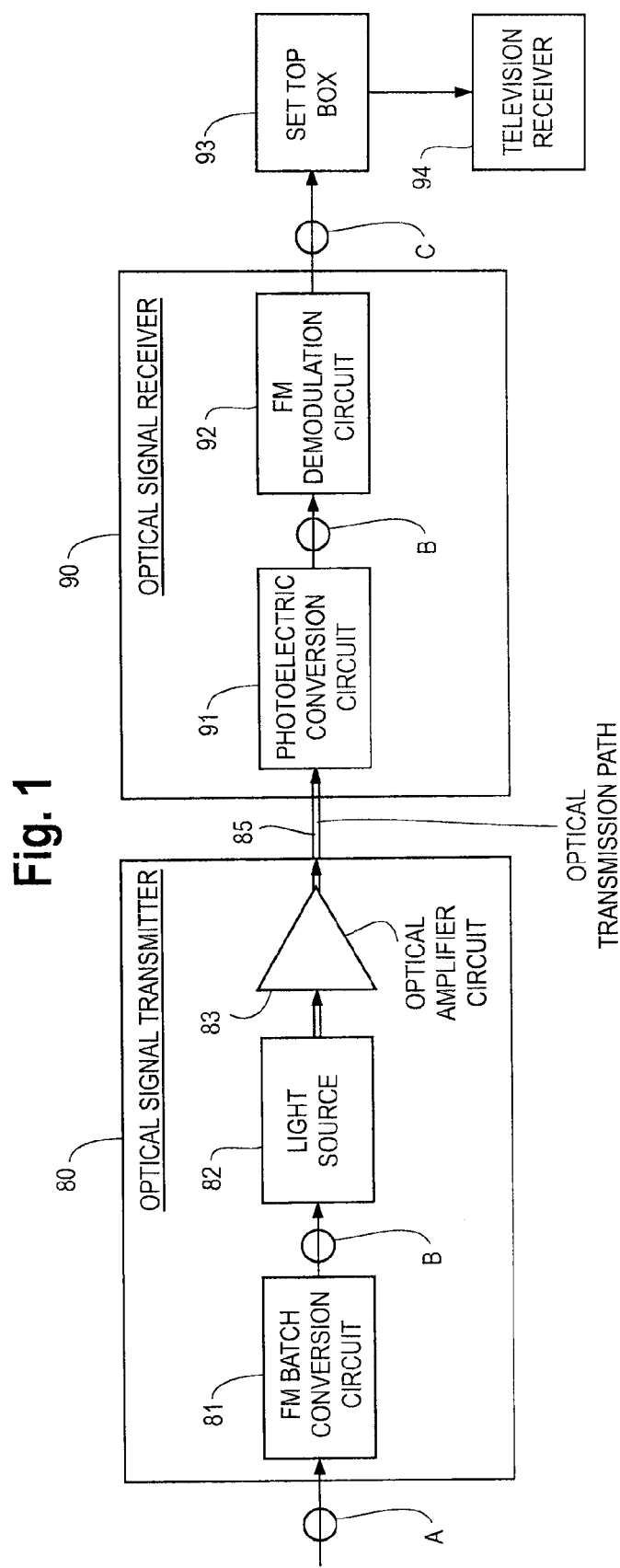

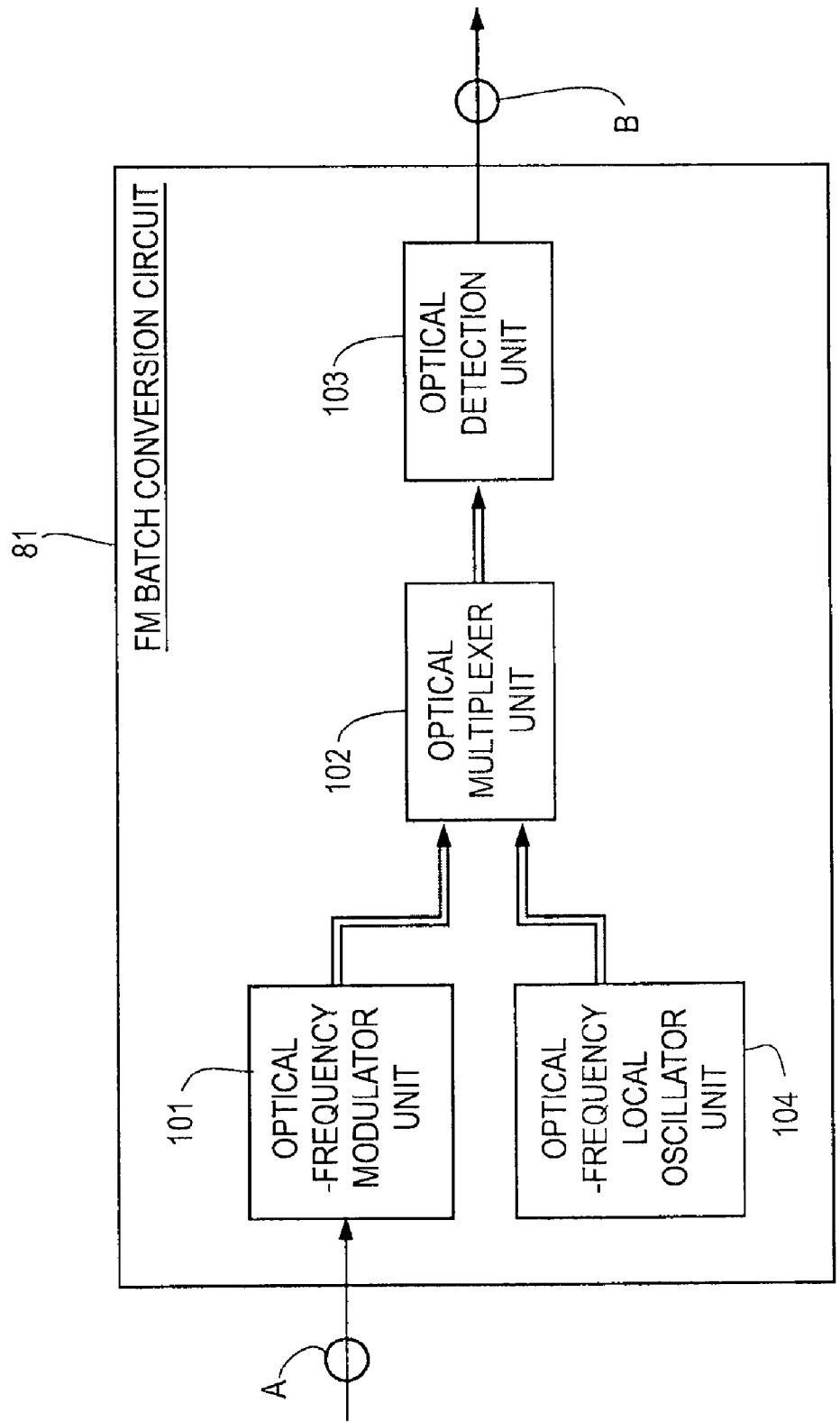

US 7,444,084 B2

OPTICAL SIGNAL RECEIVER, OPTICAL SIGNAL RECEIVING EQUIPMENT, AND OPTICAL SIGNAL TRANSMITTING SYSTEM

TECHNICAL FIELD

This invention relates to an optical signal receiver and optical receiving equipment that are used for transmission of an optical signal in which wide-band signals are frequency-modulated (FM: Frequency Modulation), and to an optical signal transmission system that uses the optical signal receiver or the optical signal receiving equipment. More specifically, this invention relates to an optical signal receiver and optical signal receiving equipment that are used for optical signal transmission of multichannel picture signals each of which is amplitude-modulated (AM: Amplitude Modulation) or quadrature-amplitude-modulated (QAM: Quadrature Amplitude Modulation) and that are frequency-division-multiplexed, and an optical signal transmission system that uses the optical signal receiver or the optical signal receiving equipment.

BACKGROUND ART

Conventionally, as an optical signal receiver, optical signal receiving equipment and an optical signal transmission system that transmit multichannel picture signals each of which was amplitude-modulated or quadrature-amplitude-modulated and that have been frequency-division-multiplexed, there are known an optical signal receiver, optical signal receiving equipment, and an optical signal transmission system each of which uses an FM batch conversion method of frequency-modulating collectively picture signals that have been frequency-division-multiplexed.

The optical signal transmitter and the optical signal transmission system that use this FM batch conversion method has been adopted in International Standards ITU-T J. 185 "Transmission equipment for transferring multi-channel television signals over optical access networks by FM conversion" (see Non-patent document 1).

FIG. 1 shows the configuration of the optical signal receiver and the optical signal transmission system that use the conventional FM batch conversion method. FIG. 2A, FIG. 2B, and FIG. 2C show signal spectra in positions of A, B, and C in FIG. 1. The optical signal transmission system shown in FIG. 1 comprises: an optical signal transmitter 80 having an FM batch conversion circuit 81, a light source 82, and an optical amplifier circuit 83; an optical transmission path 85; an optical signal receiver 90 having a photoelectric conversion circuit 91 and an FM demodulator circuit 92; a set top box 93; and a television receiver 94. FIG. 2A, FIG. 2B, and FIG. 2C show spectra of A, B, C in FIG. 1, respectively. This correspondence is the same for spectra of A, B, and C in subsequent figures.

In FIG. 1, in the optical signal transmitter 80, the picture signals that have been frequency-division-multiplexed as shown in FIG. 2A are converted to a single frequency-modulated signal that occupies a wide band, as shown in FIG. 2B, by the FM batch conversion circuit 81. The frequency-modulated signal is allowed to intensity-modulate the light source 82. Further, the optical signal is amplified by the optical amplifier circuit 83 and transmitted in the optical transmission path 85. In the optical signal receiver 90, the optical signal is returned to the electrical signal by photoelectric conversion in the photoelectric conversion circuit 91. This electrical signal is a wide-band frequency-modulated signal, which is frequency-demodulated by the FM demodulator circuit 92 to yield picture signals that have been frequency-division-multiplexed, as shown in FIG. 2C. The picture signals thus demodulated are selected to display an appropriate video channel on the television receiver 94 through the set top box 93.

FIG. 3 shows the configuration of an FM batch conversion circuit using an optical-frequency modulation unit and an optical-frequency local oscillator unit that can be applied to this FM batch conversion method (for example, see Patent document 1, Non-patent document 2, and Non-patent document 3). The FM batch conversion circuit 81 shown in FIG. 3 comprises an optical-frequency modulation unit 101, an optical multiplexer unit 102, a photodiode 103 as an optical detection unit, and an optical-frequency local oscillator unit 104.

Consider the optical-frequency modulation unit 101 frequency-modulating a carrier light source of optical frequency fo at a frequency fs in the FM batch conversion circuit 81. Representing a frequency shift by δf, an optical frequency of the optical signal Ffmld at an output of the optical-frequency modulation unit 101 is given by $$Ffmld = fo + \delta f \cdot \sin(2\pi \cdot fs \cdot t). \quad (1)$$

As the carrier light source of the optical-frequency modulation unit 101, a DFB-LD (Distributed Feed-Back Laser Diode, distributed feedback semiconductor laser) is used.

The optical-frequency local oscillator unit 104 makes the oscillation light source oscillate a light of optical frequency fl, which is multiplexed with an optical signal from the optical-frequency modulation unit 101 in the optical multiplexer unit 102. A DFB-LD is used as the oscillation light source of the optical-frequency local oscillator unit 104. Two optical signals multiplexed in the optical multiplexer unit 102 are detected in an optical detection unit 103. The opto-heterodyne is applied as a detection method and a photodiode is used as the detection element. The frequency f of the detected electrical signal is given by $$f = fo - fl + \delta f \cdot \sin(2\pi \cdot fs \cdot t). \quad (2)$$

Here, if the optical frequency of the carrier light source of the optical-frequency modulation unit 101 and that of the oscillation light source of the optical-frequency local oscillator unit 104 are brought close to each other, an electrical signal whose intermediate frequency fi=fo−fl is a few GHz and that is frequency-modulated with a frequency shift δf, as shown in FIG. 2B, can be obtained.

Since generally, when the DFB-LD is modulated by an injected current, its optical frequency varies with the injection current in a width of a few GHz, a value of a few GHz can be obtained as the frequency shift δf. For example, multichannel AM picture signals or QAM picture signals that have been frequency-division-multiplexed in a frequency span ranging from about 90 MHz to about 750 MHz can be converted into a frequency-modulated signal in a band of about 6 GHz whose intermediate frequency fi=fo−fl is about 3 GHz, as shown in FIG. 2A, using the FM batch conversion circuit.

FIG. 4 shows an example of another FM batch conversion circuit that is applied to this FM batch conversion method and that uses two optical-frequency modulation units in a push-pull configuration. The FM batch conversion circuit 81 shown in FIG. 4 comprises a differential distributor 105, an optical-frequency modulation unit 106, an optical-frequency modulation unit 107, an optical multiplexer unit 102, and a photodiode as the optical detection unit 103.

In the FM batch conversion circuit 81, the picture signals that have been frequency-division-multiplexed as shown in FIG. 2A are distributed to two electrical signals whose phases are inverted to each other in the differential distribution unit 105. When frequency modulation is performed on an optical signal using one electrical signal out of the two electrical signals from the differential distribution unit 105 as the modulation input and also using the carrier light source of optical frequency fo1 in the optical-frequency modulation unit 106, the optical frequency Ffmld1 of the optical signal at an output of the optical-frequency modulation unit 106 is given by the following formula in the case of a frequency shift δf/2, $$Ffmld1 = fo1 + (\delta f/2) \cdot \sin(2\pi \cdot fs \cdot t). \tag{3}$$

Here, in Formula (3), the modulation signal is assumed to be a signal of frequency fs. When frequency modulation is performed using the other electrical signal out of the two electrical signals from the differential distribution unit 105 as the modulation input and also using the carrier light source of optical frequency fo2 in the optical-frequency modulation unit 107, the optical frequency Ffmld2 of the optical signal at the output of the optical-frequency modulation unit 106 is given by the following formula in the case of a frequency shift δf/2, $$Ffmld2 = fo2 - (\delta f/2) \cdot \sin(2\pi \cdot fs \cdot t) \tag{4}$$

In Formula (4), the modulation signal is assumed to be a signal of frequency fs. As carrier light sources of the optical-frequency modulation units 106 and 107, DFB-LDs (Distributed Feed-Back Laser Diodes, distributed feedback semiconductor lasers) can be used.

The outputs from the optical-frequency modulation units 106 and 107 are multiplexed in the optical multiplexer unit 102, and two optical signals multiplexed in the optical multiplexer unit 102 are heterodyne-detected in the optical detection unit 103. As the optical detection unit, photodiodes functioning as heterodyne detection elements can be used. The electrical signal that was heterodyne-detected in the optical detection unit 103 is an electrical signal whose frequency f equals a difference between values expressed by Formula (3) described above and by Formula (4) described above. That is, the frequency is given by $$f = fo1 - fo2 + \delta f \sin(2\pi \cdot fs \cdot t). \tag{5}$$

However, the modulation signal is assumed to be a signal of frequency fs in Formula (5). Here, if the optical frequency of the carrier light source of the optical-frequency modulation unit 106 and that of the oscillation light source of the optical-frequency local oscillator unit 107 are brought close to each other, an electrical signal whose intermediate frequency fi=fo−fl is a few GHz and that is frequency-modulated with a frequency shift δf, as shown in FIG. 2B, can be obtained.

Generally, when the DFB-LD is modulated by an injected current, the optical frequency thereof is varied in a width of a few GHz in accordance with the injected current; therefore, a frequency shift δf of a few GHz can be obtained. For example, multichannel AM picture signals or QAM picture signals that have been frequency-division-multiplexed in a frequency span ranging from about 90 MHz to about 750 MHz can be converted into a frequency-modulated signal in a band of about 6 GHz whose intermediate frequency fi=fo−fl is set to about 3 GHz, as shown in FIG. 2B, by the FM batch conversion circuit.

FIG. 5 shows another FM batch conversion circuit that is applied to this FM batch conversion method and that uses a voltage controlled oscillation element. The FM batch conversion circuit 81 shown in FIG. 5 is equipped with a voltage controlled oscillation unit 111 using a voltage controlled oscillation element.

In the FM batch conversion circuit 81, when the picture signals that have been frequency-division-multiplexed as shown in FIG. 2A are frequency-modulated using a frequency fo as a center frequency in the voltage controlled oscillation unit 111, the frequency fv of an output electrical signal is given by the following formula in the case of a frequency shift δf.

$$fv = fo + \delta f \sin(2\pi \cdot fs \cdot t) \tag{6}$$

Thus, the frequency-modulated signal with an intermediate frequency fi=fo and a frequency shift δf can be obtained. Note that the modulation signal is assumed to be a signal of frequency fs in Formula (6).

For example, multichannel AM picture signals or QAM picture signals that have been frequency-division-multiplexed in a frequency span ranging from about 90 MHz to about 750 MHz can be converted into a frequency-modulated signal in a band of about 6 GHz, as shown in FIG. 2B, by the FM batch conversion circuit 81 with an intermediate frequency fi=fo being set to about 3 GHz.

FIG. 6 shows an example of another FM batch conversion circuit that is applied to this FM batch conversion method and that uses two voltage controlled oscillation elements in a push-pull configuration. The FM batch conversion circuit 81 shown in FIG. 6 comprises the differential distribution unit 105, a voltage controlled oscillation unit 112, a voltage controlled oscillation unit 114, a mixer 115, and a low pass filter 117.

In the FM batch conversion circuit 81, the picture signals that have been frequency-division-multiplexed as shown in FIG. 2A are distributed to two electrical signals whose phases are inverted to each other in the differential distribution unit 105. When, using one electrical signal out of the two electrical signals from the differential distribution unit 105 as a modulation input, frequency modulation that uses a frequency fo as the center frequency is performed in the voltage controlled oscillation unit 112, the frequency fv1 of the output electrical signal is given by the following formula in the case of a frequency shift δf/2, $$fv1 = fo1 + (\delta f/2) \cdot \sin(2\pi \cdot fs \cdot t). \tag{7}$$

That is, a frequency-modulated signal with an intermediate frequency fi=fo1 and a frequency shift δf/2 is obtained. In Formula (7), the modulation signal is assumed to be a signal of frequency fs. When, using the electrical signal out of the two electrical signals from the differential distribution unit 105 as a modulation input, frequency modulation that uses a frequency fo1 as the center frequency in the voltage controlled oscillation unit 114 is performed, the frequency fv2 of the output electrical signal is given by the following formula in the case of a frequency shift δf/2, $$fv2 = fo2 - (\delta f/2) \cdot \sin(2\pi fs \cdot t) \tag{8}$$

A frequency-modulated signal with an intermediate frequency fi=fo2 and a frequency shift δf/2 is obtained. In Formula (8), the modulation signal is assumed to be a signal of frequency fs.

The outputs from the voltage controlled oscillation units 112 and 114 are mixed by the mixer 115, and a signal into which the two electrical signals were mixed by the mixer 115 is smoothed by the low pass filter 117. The electrical signal smoothed by the low pass filter 117 that passes an electrical signal of a frequency equal to a difference between the intermediate frequency fo1 and the intermediate frequency fo2 becomes an electrical signal whose frequency equals a difference between values expressed by Formula (7) described above and by Formula (8) described above. That is, the frequency is given by $$f=fo1-fo2+\delta f \sin(2\pi\cdot fs\cdot t). \quad (9)$$

In Formula (9), the modulation signal is assumed to be a signal of frequency fs. Here, an electrical signal whose intermediate frequency fi=fo1−fo2 is a few GHz and that is frequency modulated with a frequency shift δf, as shown in FIG. 2B, can be obtained.

For example, multichannel AM picture signals or QAM picture signals that have been frequency-division-multiplexed in a frequency span ranging from about 90 MHz to about 750 MHz can be converted into a frequency-modulated signal in a band of about 6 GHz, as shown in FIG. 2B, with an intermediate frequency fi=fo1−fo2 being set to about 3 GHz by the FM batch conversion circuit.

Heretofore, as a technique aiming at reduction of distortion, a pre-distortion circuit is known (for example, see Patent document 2). FIG. 7 shows the configuration of an optical signal transmission system using the conventional FM batch conversion method in which a predistortion circuit is applied to distortion compensation of the FM batch conversion circuit. The optical signal transmission system shown in FIG. 7 comprises: the optical signal transmitter 80 having a predistortion circuit 86, the FM batch conversion circuit 81, the light source 82 as a transmitter circuit, and the optical amplifier circuit 83; the optical transmission path 85; the optical signal receiver 90 having the photoelectric conversion circuit 91 and the FM demodulator circuit 92; the set top box 93; and the television receiver 94. Signal spectra A, B, and C in FIG. 7 become frequency spectra shown in FIG. 2A, FIG. 2B, and FIG. 2C, respectively.

When multichannel AM picture signals or QAM picture signals are inputted into the predistortion circuit 86, the predistortion circuit 86 adds beforehand a distortion inverse to a distortion that the FM batch conversion circuit 81 etc. will generate, and thereby compensates the distortion generated by the subsequent FM batch conversion circuit 81 etc. An output of the predistortion circuit 86 is frequency-modulated by the FM batch conversion circuit 81, converted from the electrical signal to an optical signal by the light source 82, optically amplified by the optical amplifier circuit 83, and subsequently transmitted in the optical transmission path 85. The transmitted optical signal passes through the optical transmission path 85, is converted to an electrical signal by the photoelectric conversion circuit 91 of the optical signal receiver 90, and frequency-demodulated to yield the original AM picture signals or QAM picture signals by the FM demodulator circuit 95.

FIG. 8 shows an example of the configuration of the predistortion circuit. The predistortion circuit 86 shown in FIG. 8 comprises an inphase distribution unit 121, a delay line 122, a distortion generator circuit 123, an amplitude adjusting unit 124, a delay adjusting unit 125, and a differential combining unit 126. The multichannel AM picture signals or QAM picture signals inputted into the inphase distribution unit 121 are split into two sets of signals. One set of split signals is added with a distortion that will generate in the FM batch conversion circuit etc. by the distortion generation circuit 123, and their amplitudes and delays are adjusted by the amplitude adjusting unit 124 and the delay adjusting unit 125, respectively. The other set of split signals is delayed by the delay line 122. The signals outputted from the delay adjusting unit 125 and those outputted from the delay line 122 are combined in the differential combining unit 126. As a result, the signal outputted from the differential combining unit 126 becomes a signal to which a distortion inverse to a distortion that the FM batch conversion circuit etc. will generate is added beforehand.

On the other hand, as a frequency demodulator circuit method, there is a delay line detection method. FIG. 9 shows the configuration of the FM demodulator circuit based on delay line detection that is applicable to the optical signal receiver 90. The FM demodulator circuit 92 shown in FIG. 9 comprises a limiting amplifying unit 131, a delay line 132, an AND gate 133, and a low pass filter 134.

In the FM demodulator circuit 92, the inputted frequency-modulated optical signal is shaped into a rectangular wave by the limiting amplifying unit 131. An output of the limiting amplifying unit 131 is split into two outputs; one output is inputted into an input terminal of the AND gate 133, and the other output is inputted into an input terminal of the AND gate 133 after being inverted in polarity and delayed by a time τ by the delay line 132. When this output of the AND gate 133 is smoothed by the low pass filter 134, the output will become a frequency-demodulated output (for example, see Non-patent document 2). It is known that an OR gate is also applicable instead of an AND gate (for example, see Patent document 3).

Such transmission of multichannel picture signals requires low distortion. In Non-patent document 2, CNR (Carrier-to-Noise Ratio) is set to 42 dB or more, and CSO (Composite Second-Order Distortion) and CTB (Composite Triple Beat) are set to −54 dB or less in an optical signal transmitter and an optical signal transmission system that use the FM batch conversion method.

However, in the conventional FM demodulator circuit, the delay line 132 has a characteristic that the delay line 132 has different delay times at low frequencies and at high frequencies due to impedance mismatching at both ends of the delay line 132 used for the delay line detection, or other reasons. That is, phase distortion developed between low frequencies and high frequencies. As a result, CSO and CTB will deteriorate by the phase distortion between low frequencies and high frequencies.

In the optical signal receiver using the conventional FM batch conversion method, CSO and CTB have reached to saturated values slightly exceeding −54 dB. If the FM demodulator circuit of the optical signal receiver can be configured with lower distortion, improvement in the transmission characteristic can be expected.

Patent document 1: Japanese Patent No. 2700622
Patent document 2: Japanese Patent No. 3371355
Patent document 3: Japanese Patent Application Laid-open No. 2002-141750
Non-patent document 1: ITU-T Standard J-185 "Transmission Equipment for transferring multi-channel television signals over optical access networks by FM conversion," ITU-T
Non-patent document 2: N. Shibataetal. "Opticalvideo distribution system using FM batch conversion method," The IEICE Transaction B (Japanese Edition), Vol. J83-B, No. 7, pp. 948-959, July 2000
Non-patent document 3: Suzuki at al. "Pulsed FM batch conversion modulation analog optical CATV distribution system," IEICE Autumn Society Conference, Technical Digest, B-603, 1991

DISCLOSURE OF THE INVENTION

It was difficult to improve high-frequency phase distortion of the delay line used in the conventional FM demodulator circuit, and so it was difficult to realize a low distortion characteristic. In accordance with the above, it is the object of this invention to realize an optical signal receiver using a low-distortion FM demodulator circuit, optical signal receiving equipment, and an optical signal transmission system using either the optical signal receiver or the optical signal receiving equipment.

To achieve this object, this invention is an optical signal receiver that receives and frequency-demodulates an optical signal, comprising: an optical branch circuit for splitting an input optical signal into two signals; an optical delay line for delaying one of the two branched optical signals; a first photoelectric conversion circuit for converting the optical signal from the optical delay line into a first electrical signal; a second photoelectric conversion circuit for converting the other optical signal from the optical delay line into a second electrical signal rectangular wave forming means that outputs a single rectangular-wave signal using the first electrical signal from the first photoelectric conversion circuit and the second electrical signal from the second photoelectric conversion circuit as inputs; and a smoothing circuit for smoothing the rectangular-wave signal from the rectangular-wave forming means.

The other aspect of this invention is optical signal receiving equipment that receives and frequency-demodulates an optical signal, comprising: (1) an optical branch device for splitting an input optical signal into N signals (N is an integer of 2 or more); (2) N optical signal receivers each of which has: an optical branch circuit for splitting the optical signal from the optical branch circuit into two signals; an optical delay line for delaying one of the two branched optical signals; a first photoelectric conversion circuit for converting the optical signal from the optical delay line into a first electrical signal; a second photoelectric conversion circuit for converting the other optical signal from the optical delay line into a second electrical signal; rectangular-wave forming means that outputs a single rectangular-wave signal using the first electrical signal from the first photoelectric conversion circuit and the second electrical signal from the second photoelectric conversion circuit as inputs; and a smoothing circuit for smoothing the rectangular-wave signal from the rectangular-wave forming means; and (3) an inphase combiner that combines the N smoothed rectangular-wave signals outputted from the N optical signal receivers, respectively, being in phase with one another.

The further other aspect of this invention is an optical signal transmission system that uses the. FM batch conversion method, comprising: (1) an optical signal transmitter equipped with an FM batch conversion circuit; and (2) an optical signal receiver having: an optical branch circuit that is connected to the optical signal transmitter through an optical transmission path and splits an optical signal from the optical signal transmitter into two signals; an optical delay line for delaying one of the two branched optical signals; a first photoelectric conversion circuit for converting the optical signal from the optical delay line into a first electrical signal; a second photoelectric conversion circuit for converting the other optical signal out of the two branched optical signals into a second electrical signal; rectangular-wave forming means for outputting a single rectangular-wave signal using the first electrical signal from the first photoelectric conversion circuit and the second electrical signal from the second photoelectric conversion circuit as inputs; and a smoothing circuit for smoothing the rectangular-wave signal from the rectangular-wave forming means.

The optical signal receiver, the optical signal receiving equipment, and the optical signal transmission system of this invention can achieve excellent transmission characteristics, since the high-frequency phase distortion of the delay line is improved by using the optical delay line, such as optical fibers and planer-type optical waveguides, for a delay line.

Further, when the low distortion characteristic can be achieved, it will become possible to improve the receiving quality of a picture signal.

BRIEF DESCRIPTION OF THE DRAWINGS

[FIG. 1]
FIG. 1 is a diagram explaining the configuration of the conventional optical signal receiver and the optical signal transmission system that use the FM batch conversion method.

FIG. 2A is a diagram explaining the signal spectra in the optical signal receiver and the optical signal transmission system.

FIG. 2B is a diagram explaining the signal spectrum in the optical signal receiver and the optical signal transmission system.

FIG. 2C is a diagram explaining the signal spectra in the optical signal receiver and the optical signal transmission system.

[FIG. 3]
FIG. 3 is a block diagram of the FM batch conversion circuit that uses the optical-frequency modulation unit and the optical-frequency local oscillator unit.

FIG. 4 is a block diagram of the FM batch conversion circuit that uses the two optical-frequency modulation units in a push-pull configuration.

FIG. 5 is a block diagram of the FM batch conversion circuit that uses a voltage controlled oscillation element.

FIG. 6 is a block diagram of the FM batch conversion circuit that uses two voltage controlled oscillation elements in a push-pull configuration.

FIG. 7 is a block diagram of an optical signal transmission system using the conventional FM batch conversion method in which a predistortion circuit is applied to distortion compensation of the FM batch conversion circuit.

FIG. 8 is an illustrative block diagram of the predistortion circuit.

FIG. 9 is a block diagram of an FM demodulator circuit applicable to the optical signal receiver.

FIG. 10 is a block diagram of an optical signal receiver of Embodiment 1.

FIG. 11 is a diagram explaining signal waveforms in several points of the optical signal receiver of Embodiment 1.

FIG. 12 is a diagram explaining a frequency demodulation characteristic of the optical signal receiver of Embodiment 1.

FIG. 13 is a block diagram of an optical signal receiver of Embodiment 2.

FIG. 14 is a diagram explaining signal waveforms in several points of the optical signal receiver of Embodiment 2.
FIG. 15 is a diagram explaining a frequency demodulation characteristic of the optical signal receiver of Embodiment 2.
FIG. 16 is a block diagram of an optical signal receiver of Embodiment 3.
FIG. 17 is a diagram explaining signal waveforms in several points of the optical signal receiver of Embodiment 3.
FIG. 18 is a block diagram of an optical signal receiver of Embodiment 4.
FIG. 19 is a diagram explaining signal waveforms in several points of the optical signal receiver of Embodiment 4.
FIG. 20 is a block diagram of optical signal receiving equipment of Embodiment 5.
FIG. 21 is a block diagram of an optical transmitter that performs intensity modulation after converting optical signals into pulses in an optical signal transmission system of Embodiment 6.
FIG. 22 is a diagram explaining signal waveforms in several points of the optical transmitter that performs intensity modulation after converting optical signals into pulses in the optical signal transmission system of Embodiment 6.

BEST MODE FOR CARRYING OUT THE INVENTION

Figure 2A:
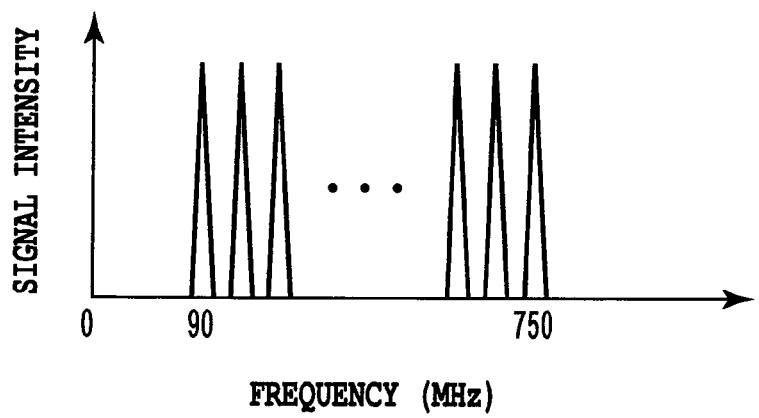
[FIG. 2A]
Figure 2B:
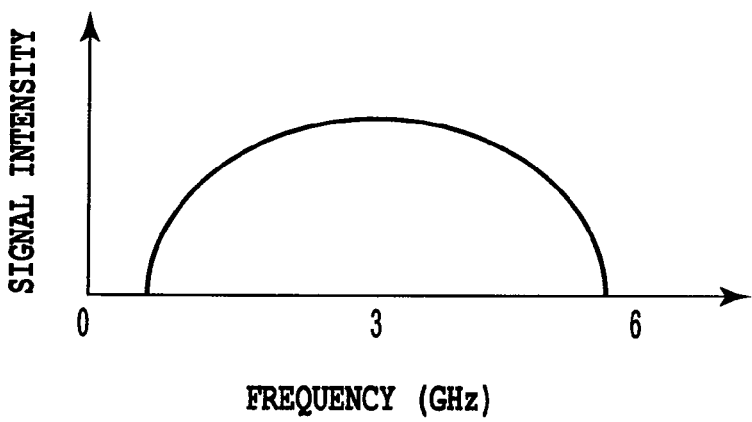
[FIG. 2B]
Figure 2C:
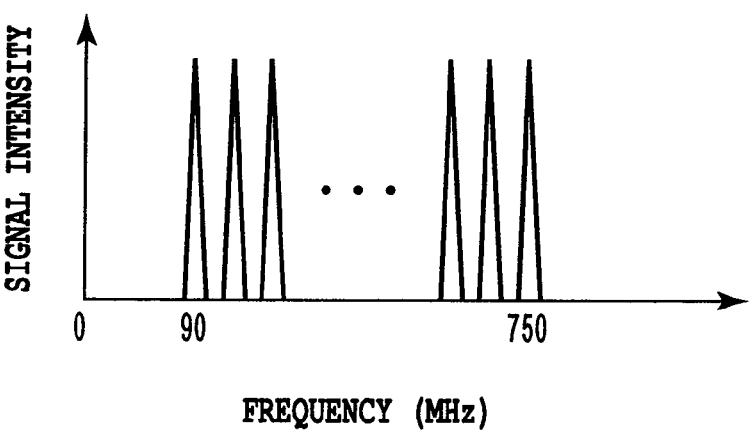
[FIG. 2C]
Figure 4:
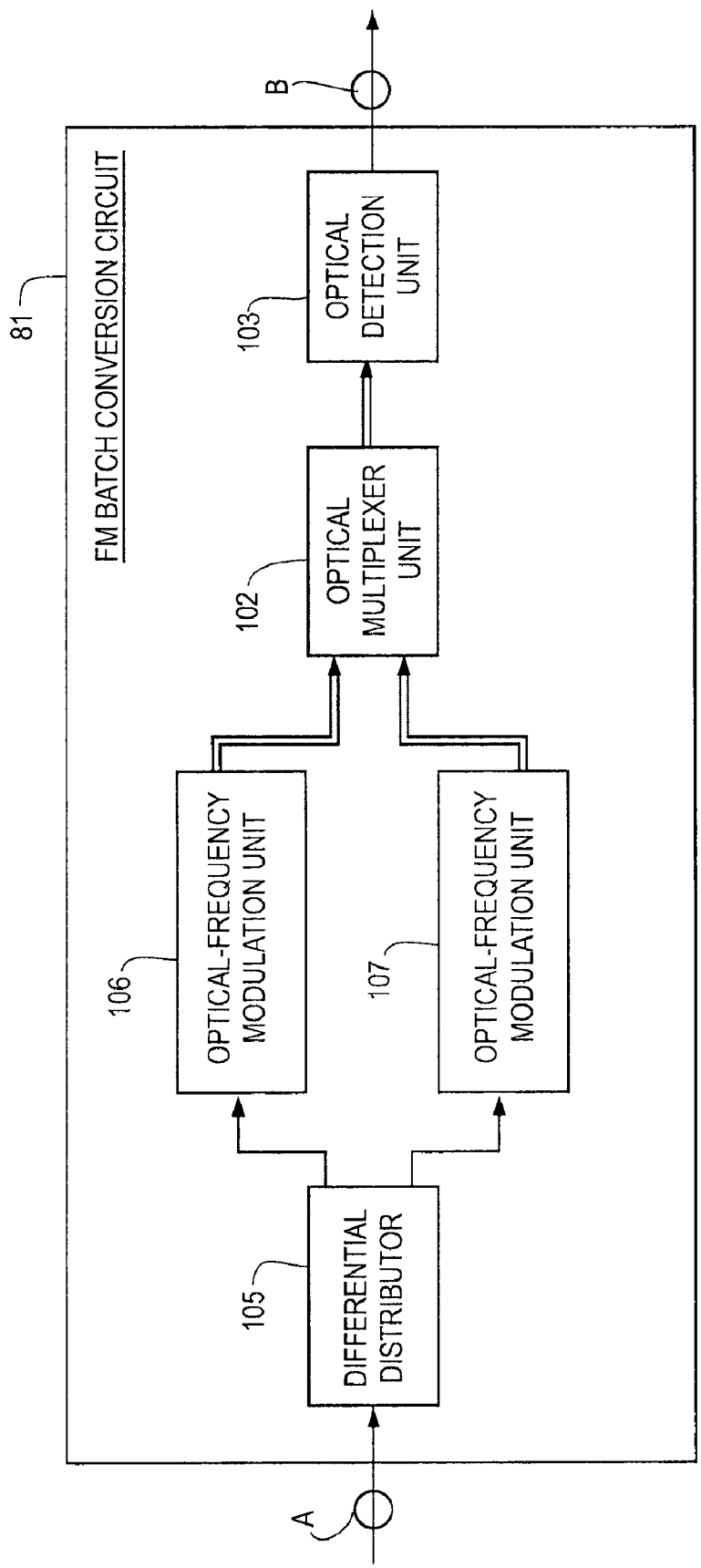
[FIG. 4]
Figure 5:
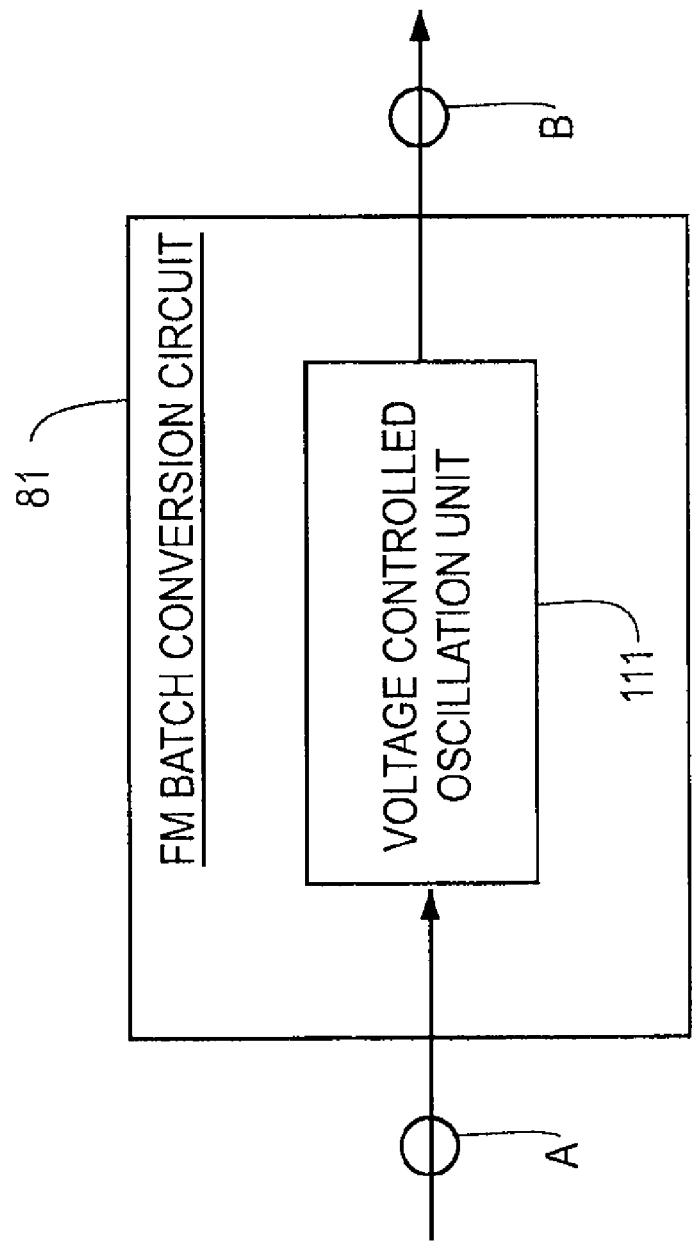
[FIG. 5]
Figure 6:
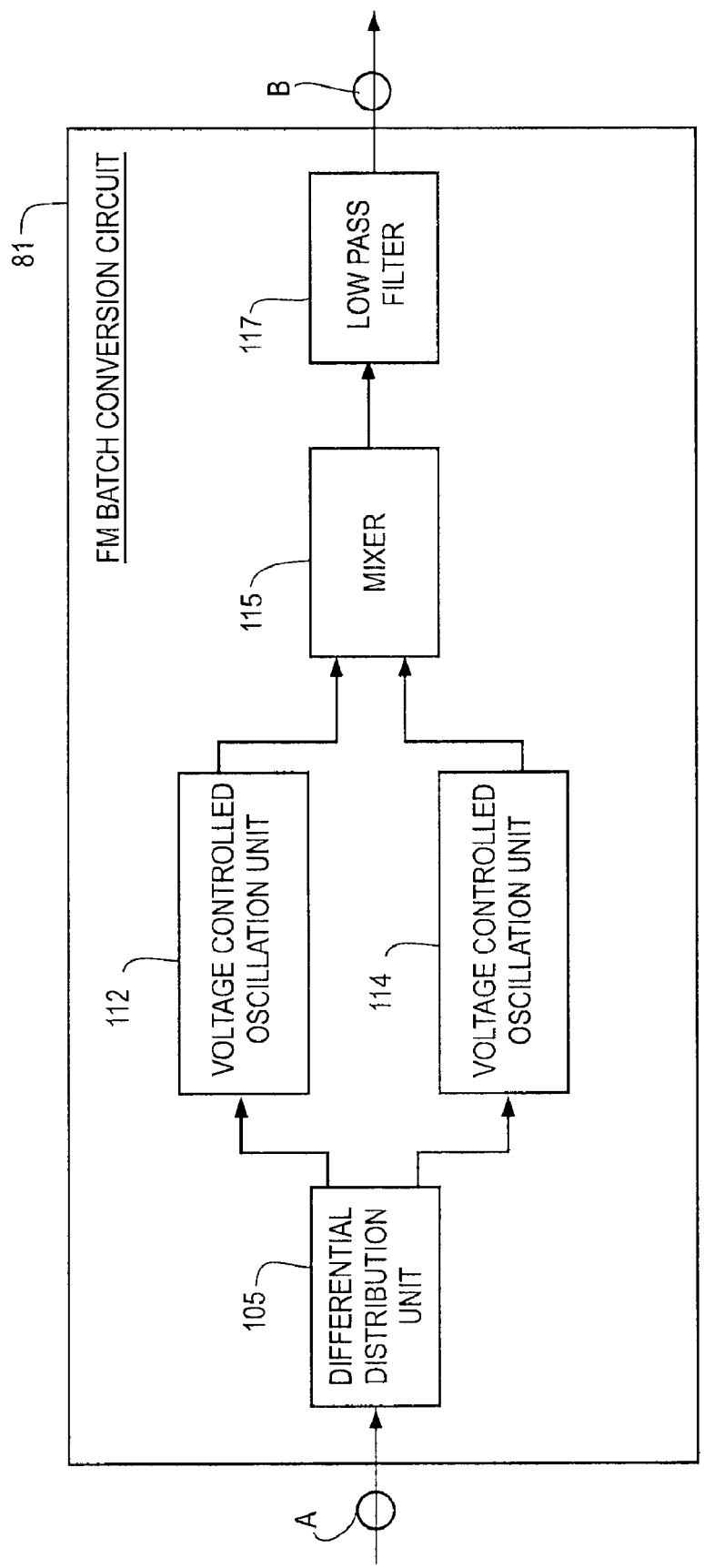
[FIG. 6]

Hereafter, embodiments of this invention will be described referring to the drawings.

Embodiment 1

Figure 10:
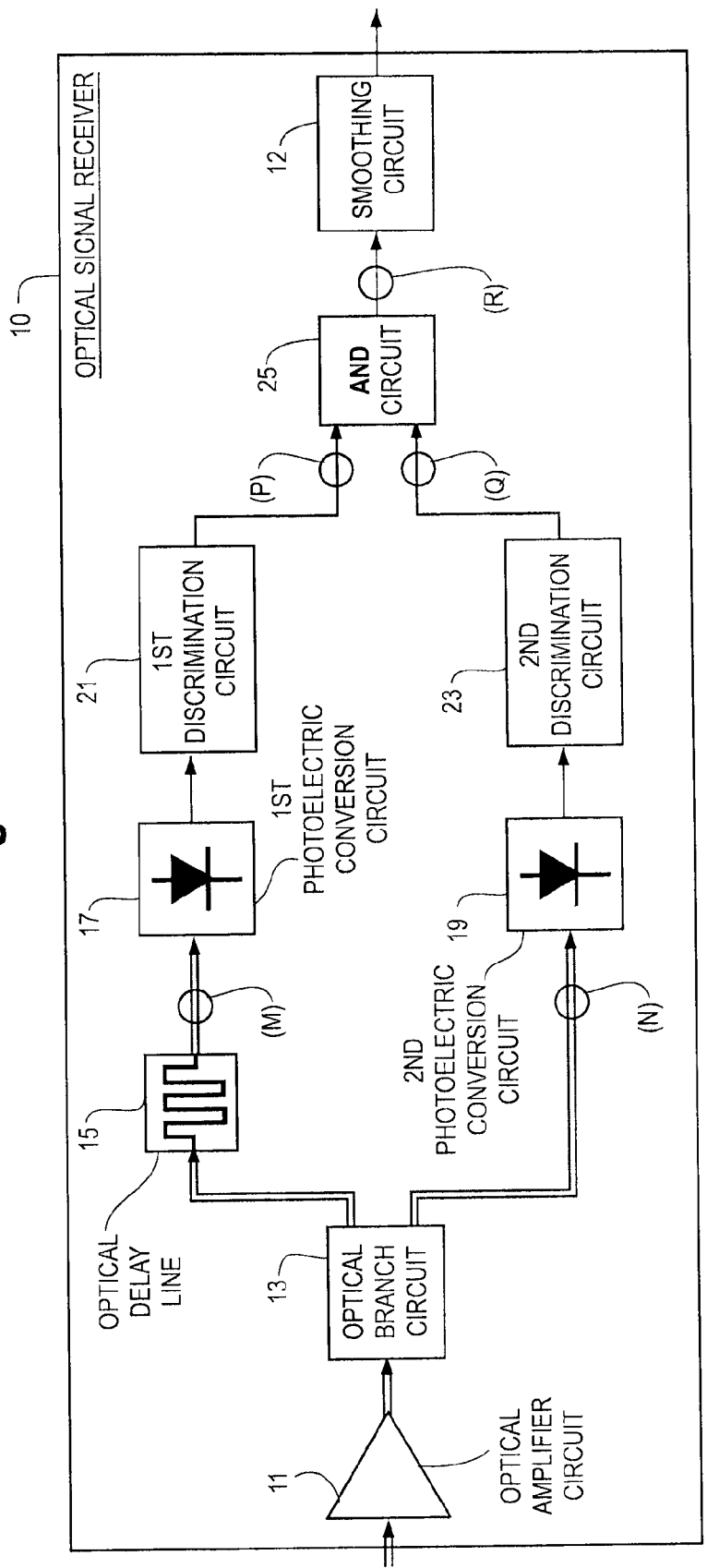
[FIG. 10]

This embodiment is an optical signal receiver for performing delay detection using an optical delay line. FIG. 10 shows the configuration of the optical signal receiver according to this embodiment. An optical signal receiver 10 shown in FIG. 10 comprises an optical amplifier circuit 11, an optical branch circuit 13, an optical delay line 15, a first photoelectric conversion circuit 17, a first discrimination circuit 21, a second photoelectric conversion circuit 19, a second discrimination circuit 23, an AND circuit 25, and a smoothing circuit 12.

Referring to FIG. 10, the configuration of the optical signal receiver of this embodiment will be described. The optical signal receiver 10 shown in FIG. 10 has a function of receiving and frequency-demodulating an optical signal that is frequency-modulated. Circuits and their operations of the optical signal receiver will be explained. The optical amplifier circuit 11 optically amplifies an optical signal inputted thereinto. As an optical amplifier circuit, semiconductor optical amplifier circuits or optical-fiber-type amplifier circuits can be used. When the optical power of the optical signal inputted into the first photoelectric conversion circuit 17 or the second photoelectric conversion circuit 19 to be described later is sufficient, the optical signal may be directly inputted into the optical branch circuit 13 omitting the optical amplifier circuit 11.

The optical signal amplified in the optical amplifier circuit 11 is split into two signals in the optical branch circuit 13. As the optical branch circuit 13, optical-fiber-coupling-type optical branch circuits or planer-type optical branch circuits can be used. It is preferable that the branching ratio is adjusted so that the optical power of the optical signal inputted into the first photoelectric conversion circuit 17 to be described later becomes equal to the optical power of the optical signal inputted into the second photoelectric conversion circuit 19 to be described later.

One of the two branched optical signals is delayed by the optical delay line 15 and subsequently inputted into the first photoelectric conversion circuit 17. The other of the two branched optical signals is inputted into the second photoelectric conversion circuit 19. As the optical delay line 15, optical fibers or planer-type optical waveguides can be used. Moreover, the optical delay line 15 and the optical branch circuit 13 can be constructed in one piece. Each of the first photoelectric conversion circuit 17 and the second photoelectric conversion circuit 19 converts an optical signal into an electrical signal, amplifies the electrical signal if needed, and outputs it to either the first discrimination circuit 21 or the second discrimination circuit 23. As the first photoelectric conversion circuit 17 and the second photoelectric conversion circuit 19, for example, photoelectric transducers of photodiodes, avalanche photodiodes, phototransistors, etc. are applicable. Since the optical delay line of this embodiment does not have such phase distortion at high frequencies as does the delay line in electrical circuits, an excellent frequency demodulation characteristic at high frequencies can be obtained.

Each of the first discrimination circuit 21 and the second discrimination circuit 23 discriminates an electrical signal that is frequency-modulated by comparing its magnitude with a threshold, and converts it to a binary signal of a rectangular wave. If the input optical signal has a duty ratio of 50%, the first discrimination circuit 21 and the second discrimination circuit 23 may be limiter amplifier circuits, respectively.

The electrical signals from the first discrimination circuit 21 and from the second discrimination circuit 23 are frequency-demodulated by being processed by an AND operation in the AND circuit 25 and by being smoothed in the smoothing circuit 12, respectively.

Figure 11:
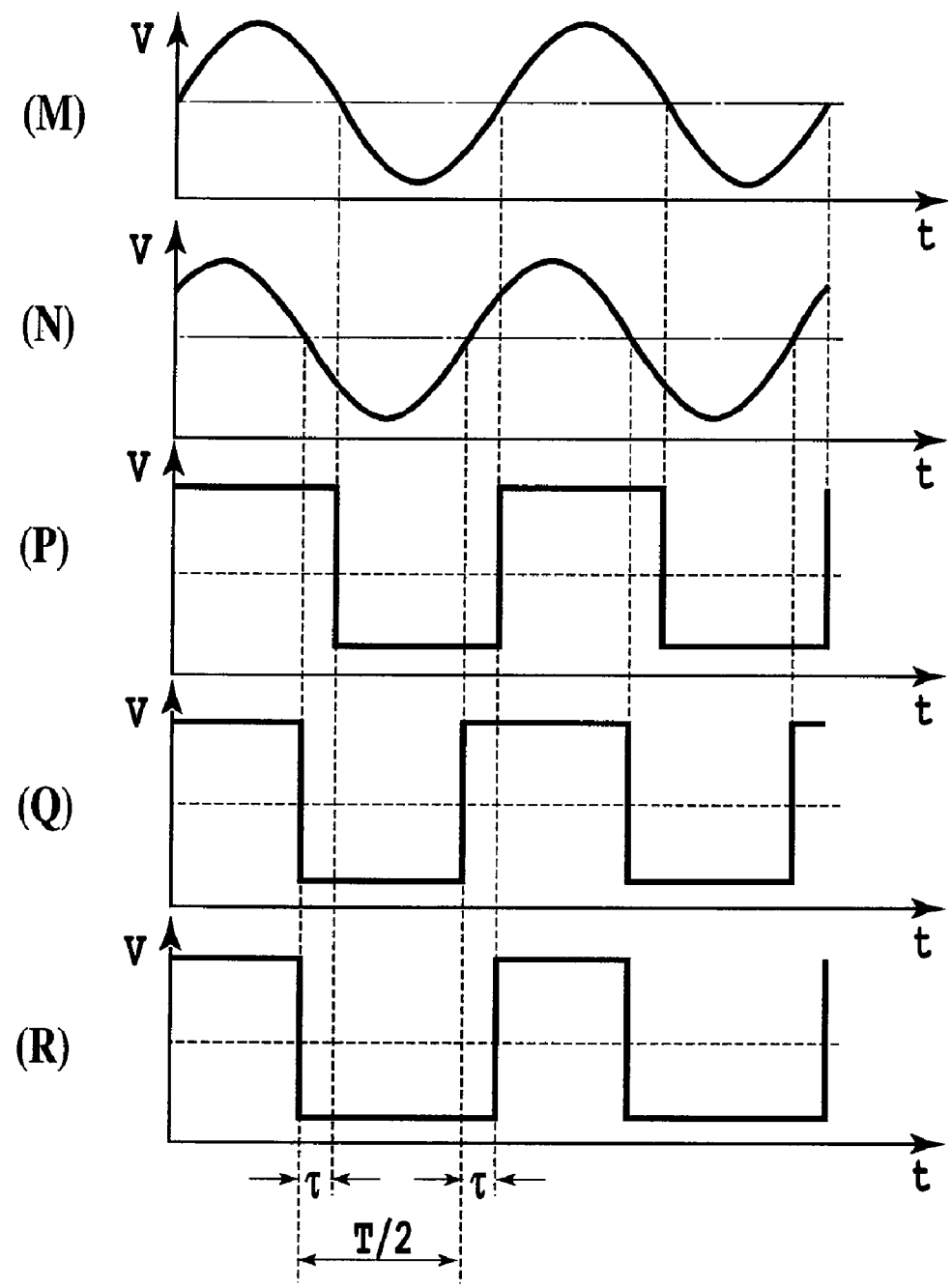
[FIG. 11]

FIG. 11 shows signal waveforms in several points of (M), (N), (P), (Q), and (R) in FIG. 10. (M), (N), (P), (Q), and (R) in FIG. 11 are signal waveforms in the points of (M), (N), (P), (Q), and (R) in FIG. 10. Hereafter, a frequency demodulation operation will be explained representing the instantaneous frequency of the optical signal inputted into the optical amplifier circuit 11 by f=1/T and representing the delay time of the optical delay line 15 by τ

The optical signal inputted into the first photoelectric conversion circuit 17 (FIG. 11(M)) is delayed by the delay line 15 by a time τ as compared with the optical signal inputted into the second photoelectric conversion circuit 19 (FIG. 11(N)). The alternate long and short dash lines in FIG. 11(M) and (N) correspond to thresholds when the optical signal is discriminated by the first discrimination circuit 21 and by the second discrimination circuit 23 after the optical signal was processed by photoelectric conversion, respectively. The electrical signals processed by photoelectric conversion are discriminated by the first discrimination circuit 21 and by the second discrimination circuit 23 in terms of level, respectively, and converted to rectangular waves while maintaining a delay time τ (FIG. 11(P), (Q)). The two electrical signals of rectangular waves are processed by an AND operation in the AND circuit 25 and the original electrical signal is thinned in pulse width by τ (FIG. 11(R)). Here, the AND operation is performed by positive logic. This electrical signal processed by the AND operation is smoothed by the smoothing circuit 12.

The output voltage Vout of the smoothing circuit 12 is expressed by the following formula.

$$Vout=Vo\times(T/2-\tau)/T=Vo\times(1/2-\tau/T)=Vo\times(1/2-\tau\cdot f) \quad (10)$$

Figure 12:
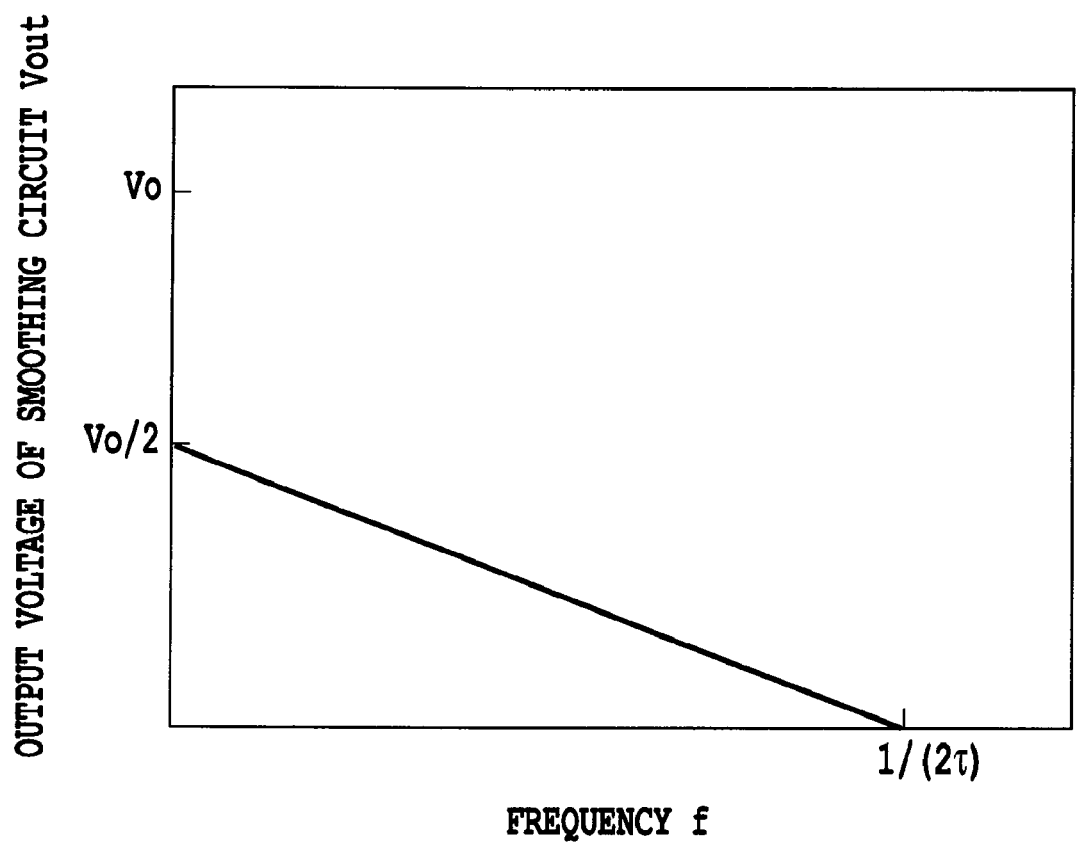
[FIG. 12]

From Formula (10), a frequency demodulation characteristic as shown in FIG. 12 can be achieved. In FIG. 12, the horizontal axis denotes frequency f, and the vertical axis denotes output voltage Vout of smoothing circuit. Thus, since the output voltage of the smoothing circuit attenuates linearly with the frequency of the input optical signal, this optical signal receiver can implement a frequency demodulation function. Incidentally, the larger the delay τ, the higher the frequency sensitivity of the output voltage becomes. However, τ cannot be made larger than 1/(2f).

As described above, the optical signal receiver of this embodiment can optically receive the optical signal that is frequency-modulated and implement a frequency demodulation function. Moreover, since the optical delay line does not have phase distortion at high frequencies, it can implement an excellent frequency demodulation characteristic at high frequencies. Incidentally, although this embodiment was described using FIG. 10, when the optical signal receiver receives the optical signal with sufficient optical power, the optical amplifier circuit 11 in FIG. 10 can be omitted.

Embodiment 2

Figure 13:
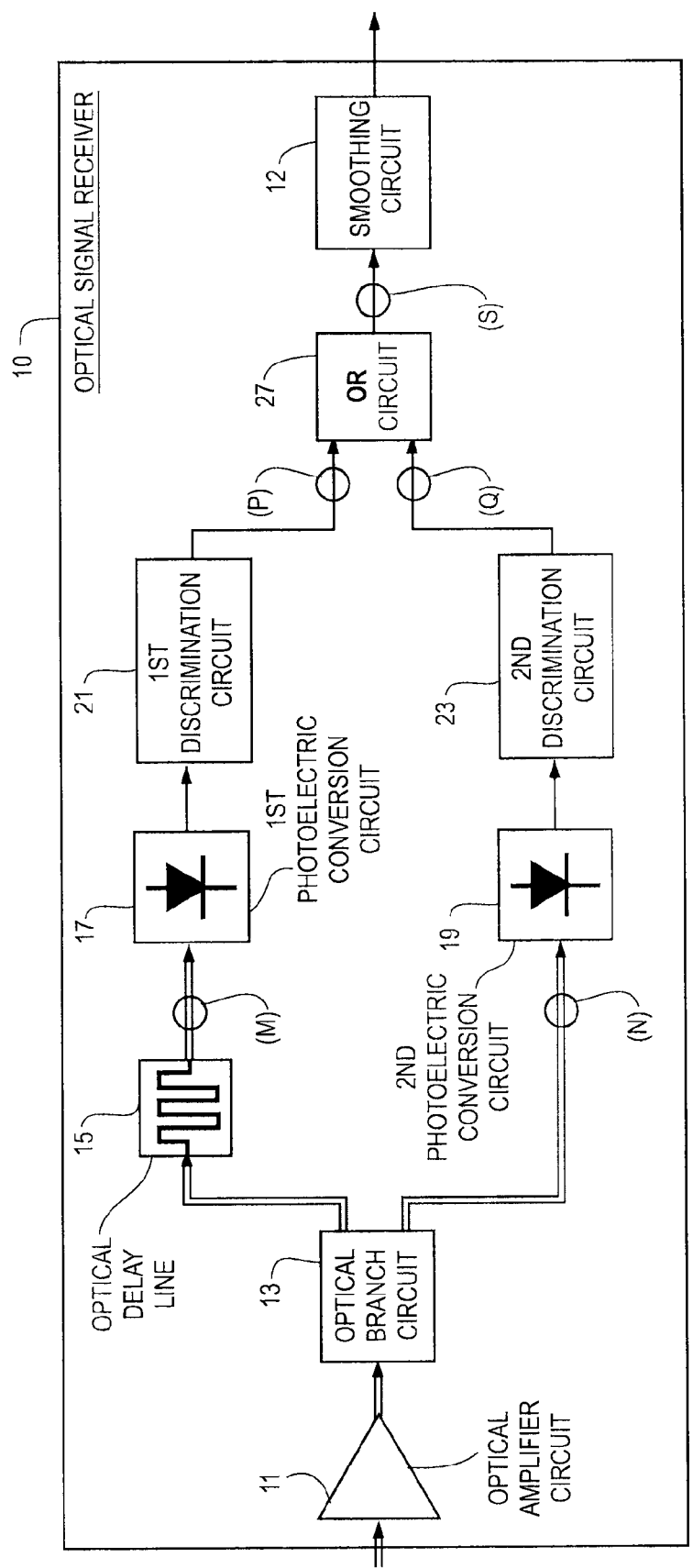
[FIG. 13]

This embodiment is an optical signal receiver for performing delay detection using an optical delay line. FIG. 13 shows the configuration of the optical signal receiver according to this embodiment. The optical signal receiver 10 shown in FIG. 13 comprises the optical amplifier circuit 11, the optical branch circuit 13, the optical delay line 15, the first photoelectric conversion circuit 17, the first discrimination circuit 21, the second photoelectric conversion circuit 19, the second discrimination circuit 23, an OR circuit 27, and the smoothing circuit 12.

Referring to FIG. 13, the configuration of this embodiment will be described. The optical signal receiver 10 shown in FIG. 13 has a function of receiving and frequency-demodulating an optical signal that is frequency-modulated. Circuits and their operations of the optical signal receiver will be explained. The optical amplifier circuit 11 optically amplifies an optical signal inputted thereinto. As the optical amplifier circuit, semiconductor optical amplifier circuits or optical-fiber-type amplifier circuits can be used. When the optical power of the optical signal inputted into the first photoelectric conversion circuit 17 to be described later or the second photoelectric conversion circuit 19 to be described later is sufficient, the optical signal may be directly inputted into the optical branch circuit 13 omitting the optical amplifier circuit 11.

The optical signal amplified in the optical amplifier circuit 11 is split into two signals in the optical branch circuit 13. As the optical branch circuit 13, optical-fiber-coupling-type optical branch circuits or planer-type optical branch circuits can be used. It is preferable that a branching ratio is adjusted so that the optical power of the optical signal inputted into the first photoelectric conversion circuit 17 to be described later becomes equal to the optical power of the optical signal inputted into the second photoelectric conversion circuit 19 to be described later.

One of the two branched optical signals is delayed by the optical delay line 15, and subsequently inputted into the first photoelectric conversion circuit 17. The other of the two branched optical signals is inputted into the second photoelectric conversion circuit 19. As the optical delay line 15, optical fibers or planer-type optical waveguides can be used. Moreover, the optical delay line 15 and the optical branch circuit 13 can be constructed in one piece. Each of the first photoelectric conversion circuit 17 and the second photoelectric conversion circuit 19 converts an optical signal into an electrical signal, amplifies the electrical signal if needed, and outputs it to the first discrimination circuit 21 or the second discrimination circuit 23. As the first photoelectric conversion circuit 17 and the second photoelectric conversion circuit 19, for example, photoelectric transducers of photodiodes, avalanche photodiodes, phototransistors, etc. are applicable. Since the optical delay line of this embodiment does not have such phase distortion at high frequencies as does the delay line in electrical circuits, an excellent frequency demodulation characteristic at high frequencies can be achieved.

Each of the first discrimination circuit 21 and the second discrimination circuit 23 discriminates the electrical signal that is frequency-modulated in the amplitude axis direction by comparing its magnitude with a threshold, respectively, and generates a binary signal of a rectangular wave. If the input optical signal has a duty ratio of 50%, the first discrimination circuit 21 and the second discrimination circuit 23 may be limiter amplifiers, respectively.

The electrical signals from the first discrimination circuit 21 and from the second discrimination circuit 23 are processed by an OR operation in the OR circuit 27 and further smoothed by the smoothing circuit 12, and thereby frequency-demodulated.

Figure 14:
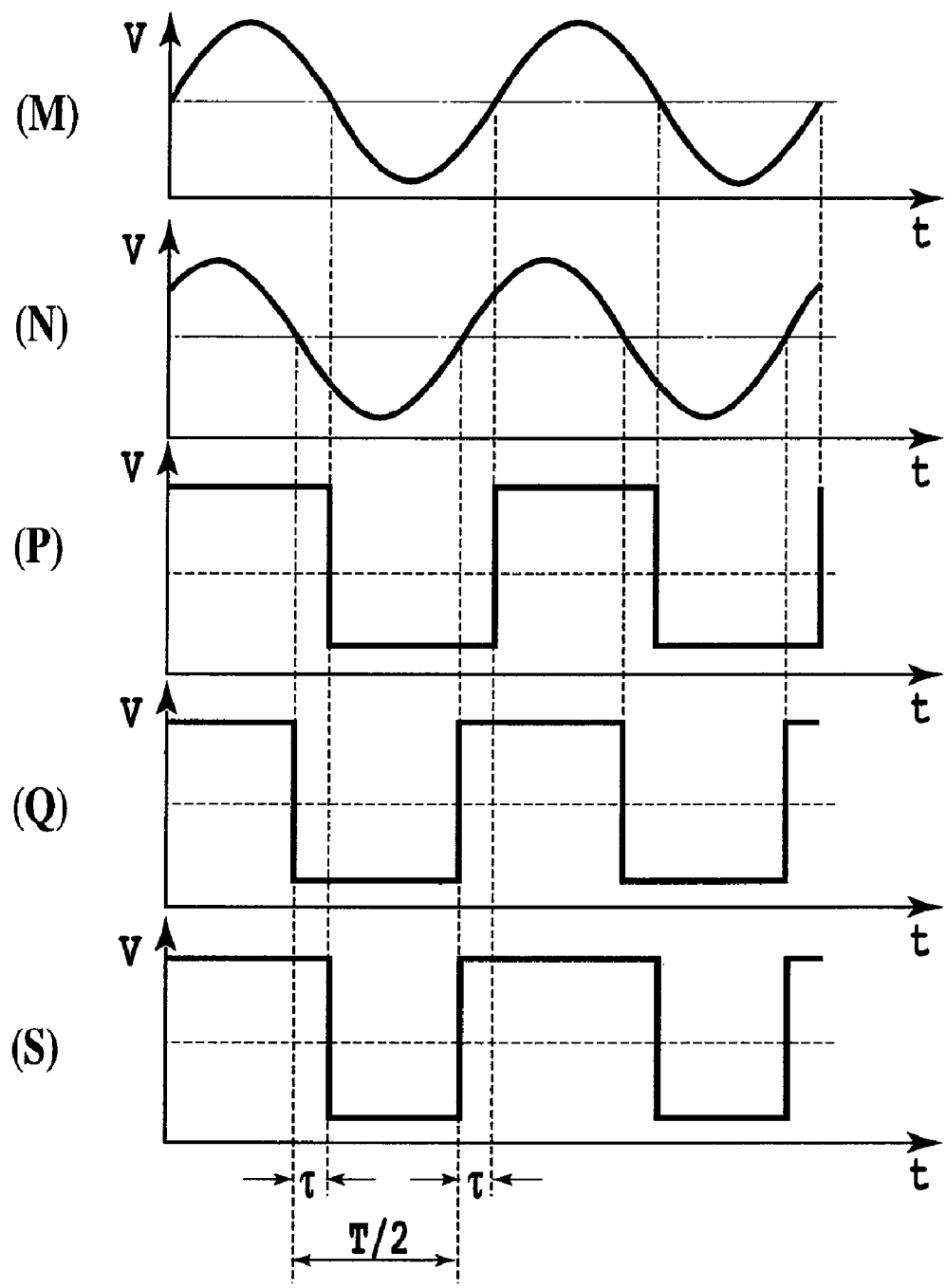
[FIG. 14]

FIG. 14 shows signal waveforms in several points of (M), (N), (P), (Q), and (S) in FIG. 13. (M), (N), (P), (Q), and (S) in FIG. 14 are the signal waveforms in the points of (M), (N), (P), (Q), and (S) in FIG. 13. Hereafter, the frequency demodulation operation will be explained representing the instantaneous frequency of the optical signal inputted into the optical amplifier circuit 11 by f=1/T and representing the delay time of the optical delay line 15 by τ.

The optical signal inputted into the first photoelectric conversion circuit 17 (FIG. 14(M)) is delayed by the optical delay line 15 by a time τ as compared with the optical signal (FIG. 14(N)) inputted into the second photoelectric conversion circuit 19. The alternate long and short dash lines in FIGS. 14(M) and (N) correspond to thresholds used when the electrical signal is discriminated by the first discrimination circuit 21 and by the second discrimination circuit 23, respectively, after being processed by photoelectric conversion. The electrical signals processed by the photoelectric conversion are discriminated in level by the first discrimination circuit 21 and by the second discrimination circuit 23, and converted to rectangular waves while maintaining the delay time τ (FIG. 14(P), (Q)). The two electrical signals of rectangular waves are processed by an OR operation in the OR circuit 27 and an electrical signal whose pulse width is widened by τ is generated (FIG. 14(S)). Here, the OR operation is performed by positive logic. This electrical signal processed by an OR operation is smoothed by the smoothing circuit 12.

The output voltage Vout of the smoothing circuit 12 is expressed by the following formula.

$$Vout=Vo\times(T/2+\tau)/T=Vo\times(1/2+\tau/T)=Vo\times(1/2+\tau\cdot f) \quad (11)$$

Figure 15:
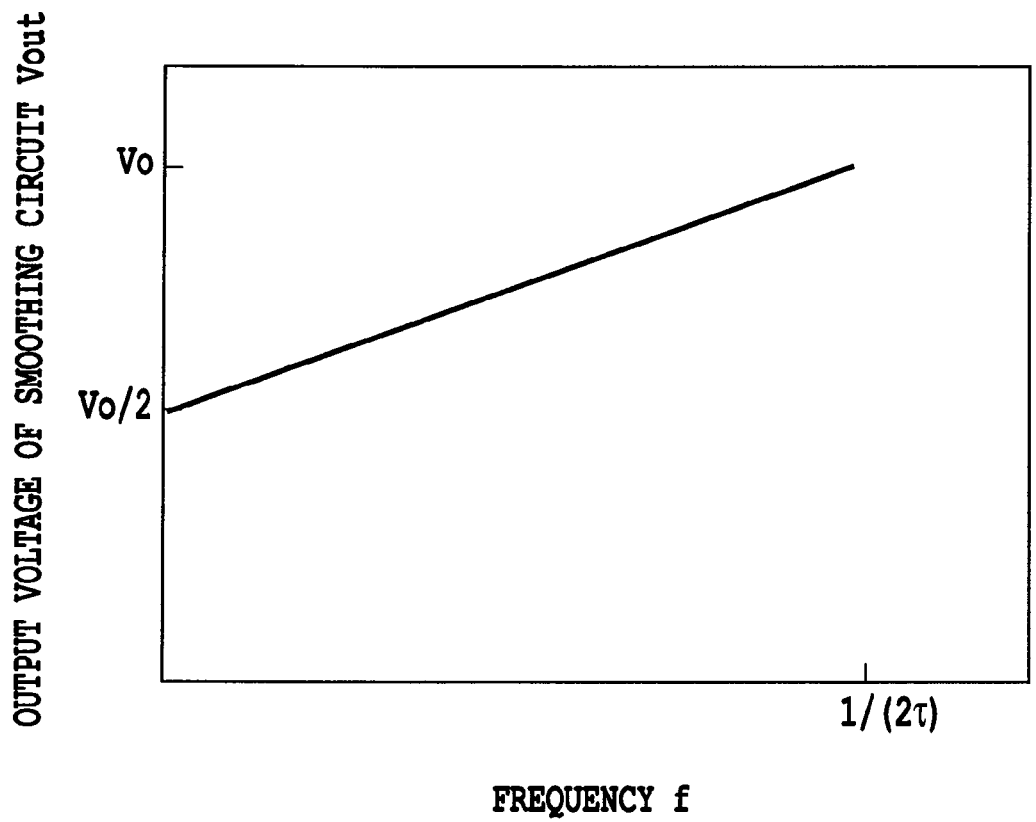
[FIG. 15]

From Formula (11), a frequency demodulation characteristic as shown in FIG. 15 can be achieved. In FIG. 15, the horizontal axis denotes frequency f and the vertical axis denotes output voltage Vout of smoothing circuit. Thus, since the output voltage of the smoothing circuit increases linearly with the frequency of the input optical signal, this optical signal receiver can implement a frequency demodulation function.

As described above, the optical signal receiver of this embodiment can optically receive the optical signal that is frequency-modulated and implement the frequency demodulation function. Moreover, since the optical delay line does not have phase distortion at high frequencies, the optical receiver can realize an excellent frequency demodulation characteristic at high frequencies. Incidentally, although this embodiment was described using FIG. 13, when the optical signal receiver receives optical signals with sufficient optical power, the optical amplifier circuit 11 in FIG. 13 can be omitted.

Embodiment 3

Figure 16:
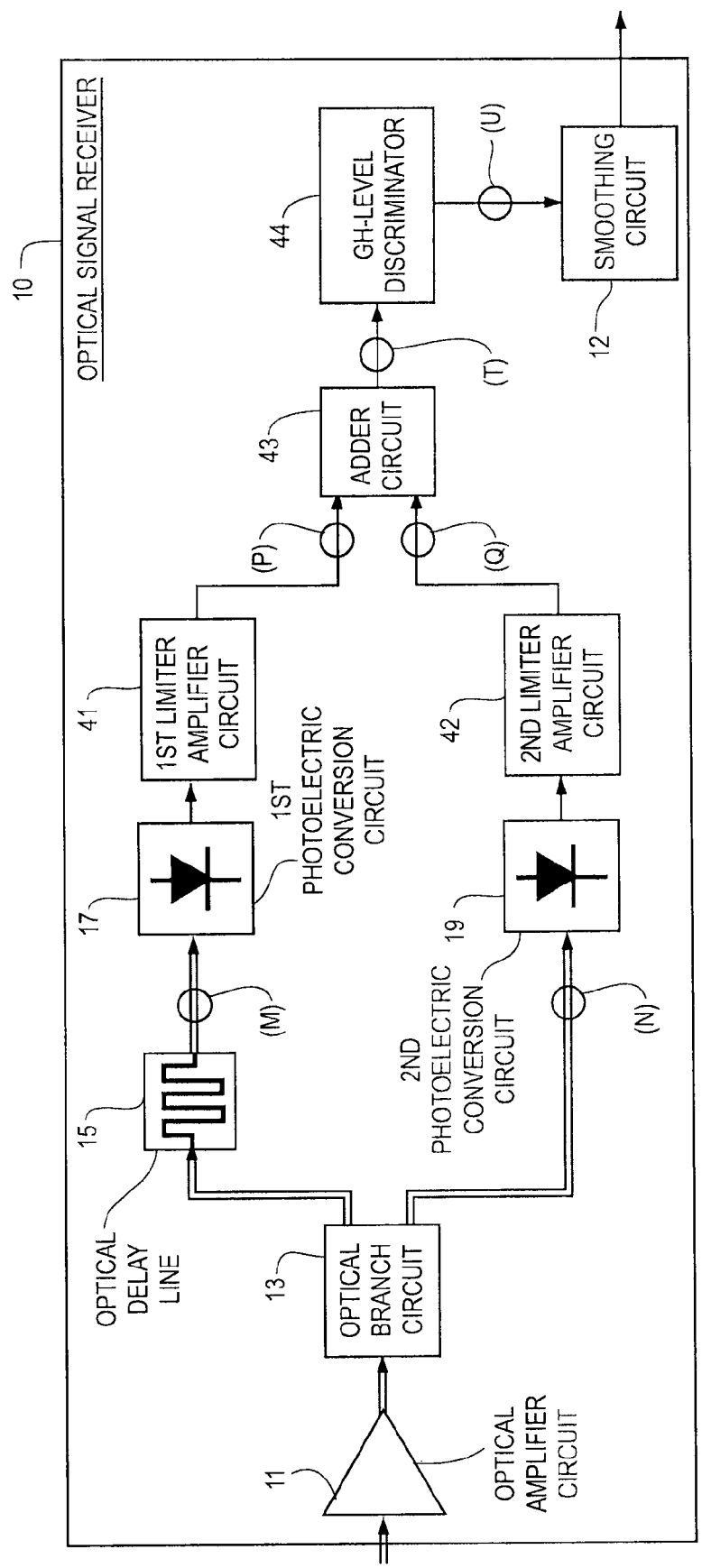
[FIG. 16]

This embodiment is an optical signal receiver for performing delay detection using an optical delay line. FIG. 16 shows the configuration of the optical receiver according to this embodiment. The optical signal receiver 10 shown in FIG. 16 comprises the optical amplifier circuit 11, the optical branch circuit 13, the optical delay line 15, the first photoelectric conversion circuit 17, a first limiter amplifier circuit 41, the second photoelectric conversion circuit 19, a second limiter amplifier circuit 42, an adder circuit 43, a high-level discriminator 44, and the smoothing circuit 12.

Referring to FIG. 16, the configuration of an optical signal receiver of this embodiment will be described. The optical signal receiver 10 shown in FIG. 16 has a function of receiving and frequency-demodulating an optical signal that is frequency-modulated. Circuits and their operations of the optical signal receiver will be explained. The optical amplifier circuit 11 optically amplifies the input optical signal. As the optical amplifier circuit, semiconductor optical amplifier circuits or optical-fiber-type amplifier circuits can be used. When the optical power of the optical signal inputted into the first photoelectric conversion circuit 17 to be described later or the second photoelectric conversion circuit 19 to be described later is sufficient, the optical signal may be directly inputted into the optical branch circuit 13 omitting the optical amplifier circuit 11.

The optical signal amplified in the optical amplifier circuit 11 is split into two signals in the optical branch circuit 13. As the optical branch circuit 13, optical-fiber-coupling-type optical branch circuits or planer-type optical branch circuits can be used. It is preferable that a branching ratio is adjusted so that the optical power of the optical signal inputted into the first photoelectric conversion circuit 17 to be described later becomes equal to the optical power of the optical signal inputted into the second photoelectric conversion circuit 19 to be described later.

One of the two branched optical signals is delayed by the optical delay line 15, and subsequently inputted into the first photoelectric conversion circuit 17. The other of the two branched optical signals is inputted into the second photoelectric conversion circuit 19. As the optical delay line 15, optical fibers or planer-type optical waveguides can be used. Moreover, the optical delay line 15 and the optical branch circuit 13 can be constructed in one piece. Each of the first photoelectric conversion circuit 17 and the second photoelectric conversion circuit 19 converts an optical signal into an electrical signal, amplifies the electrical signal if needed, and outputs it to the first limiter amplifier circuit 41 or the second limiter amplifier circuit 42. As the first photoelectric conversion circuit 17 and the second photoelectric conversion circuit 19, for example, photoelectric transducers of photodiodes, avalanche photodiodes, phototransistors, etc. are applicable. Since the optical delay line of this embodiment does not have such phase distortion at high frequencies as does the delay line in electrical circuits, an excellent frequency demodulation characteristic at high frequencies can be achieved.

Each of the first limiter amplifier circuit 41 and the second limiter amplifier circuit 42 limits and amplifies an electrical signal that is frequency-modulated in the amplitude axis direction, and outputs a binary signal of a rectangular wave. Instead of the first limiter amplifier circuit 41 and the second limiter amplifier circuit 42, automatic-gain-control amplifier circuits that amplify the electrical signals to the predetermined amplitudes can be used, respectively.

The electrical signals from the first limiter amplifier circuit 41 and the second limiter amplifier circuit 42 are added in the adder circuit 43 to yield a ternary signal. The electrical signal that has become a ternary signal is discriminated in the amplitude axis direction with a threshold existing between a level when the optical signal is inputted into both the first photoelectric conversion circuit 17 and the second photoelectric conversion circuit 19 and a level when the optical signal is inputted into either the first photoelectric conversion circuit 17 or the second photoelectric conversion circuit 19 in the high-level discriminator 44. The electrical signal that was converted to a binary signal again by the high-level discriminator 44 is frequency-demodulated by being smoothed in the smoothing circuit 12.

Figure 17:
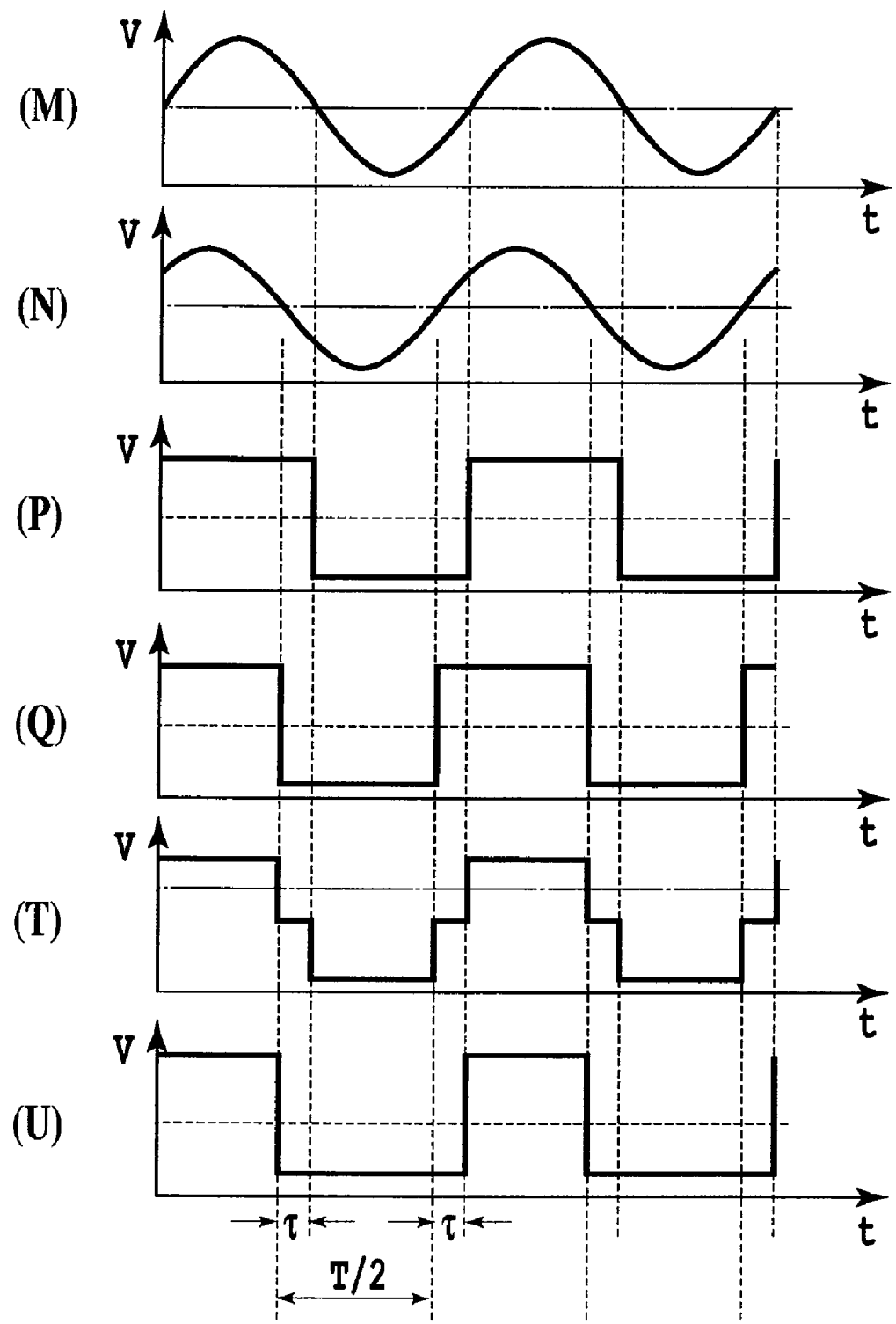
[FIG. 17]

FIG. 17 shows the signal waveforms in several points of (M), (N), (P), (Q), (T), and (U) in FIG. 16. (M), (N)$_1$ (P), (Q), (T), and (U) in FIG. 17 are signal waveforms in the points of (M), (N), (P), (Q), (T), and (U) in FIG. 16. Hereafter, the frequency demodulation operation will be explained representing the instantaneous frequency of the optical signal inputted into the optical amplifier circuit 11 by f=1/T and representing the delay time of the optical delay line 15 by τ.

The optical signal inputted into the first photoelectric conversion circuit 17 (FIG. 17(M)) is delayed by the optical delay line 15 by a time τ as compared with the optical signal inputted into the second photoelectric conversion circuit 19 (FIG. 17(N)). The alternate long and short dash lines in FIGS. 17(M) and (N) correspond to thresholds when the electrical signals are limited and amplified by the first limiter amplifier circuit 41 and by the second limiter amplifier circuit 42, respectively, after being processed by the photoelectric conversion. The electrical signals processed by the photoelectric conversion are limited and amplified by the first limiter amplifier circuit 41 and by the second limiter amplifier circuit 42, respectively, becoming rectangular waves while maintaining a delay time T (FIG. 17(P), (Q)). The two electrical signals of rectangular waves are added in the adder circuit 43 to yield a ternary signal (FIG. 17(T)). The ternary signal is discriminated in an amplitude axis direction by the high-level discrimination circuit comparing its magnitude with a threshold (FIG. 17(U)). The threshold used for discrimination exists between the level when the optical signal is inputted into both the first photoelectric conversion circuit 17 and the second photoelectric conversion circuit 19 and the level when the optical signal is inputted into either the first photoelectric conversion circuit 17 or the second photoelectric conversion circuit 19. The alternate long and short dash line in FIG. 17(T) indicates the threshold. The electrical signal (FIG. 17(U)) that becomes a binary signal by the high-level discrimination circuit is smoothed by the smoothing circuit 12.

The output voltage Vout of the smoothing circuit 12 is expressed by the following formula.

$$Vout = Vo \times (T/2-\tau)/T = Vo \times (1/2-\tau/T) = Vo \times (1/2-\tau f) \quad (12)$$

From Formula (12), a frequency demodulation characteristic as shown in FIG. 12 can be achieved. Thus, since the output voltage of the smoothing circuit attenuates linearly with the frequency of the input optical signal, this optical signal receiver can implement a frequency demodulation function. Although the larger the delay $\tau$, the higher the frequency sensitivity of the output voltage becomes, $\tau$ cannot be made larger than $1/(2f)$ because of Formula (12).

As described above, the optical signal receiver of this embodiment can optically receive the optical signal that is frequency-modulated and implement a frequency demodulation function. Moreover, since the optical delay line does not have phase distortion at high frequencies, the optical signal receiver can achieve an excellent frequency demodulation characteristic at high frequencies. Incidentally, although this embodiment was described using FIG. 16, when the optical signal receiver receives the optical signal with sufficient optical power, the optical amplifier circuit 11 in FIG. 16 can be omitted.

Embodiment 4

Figure 18:
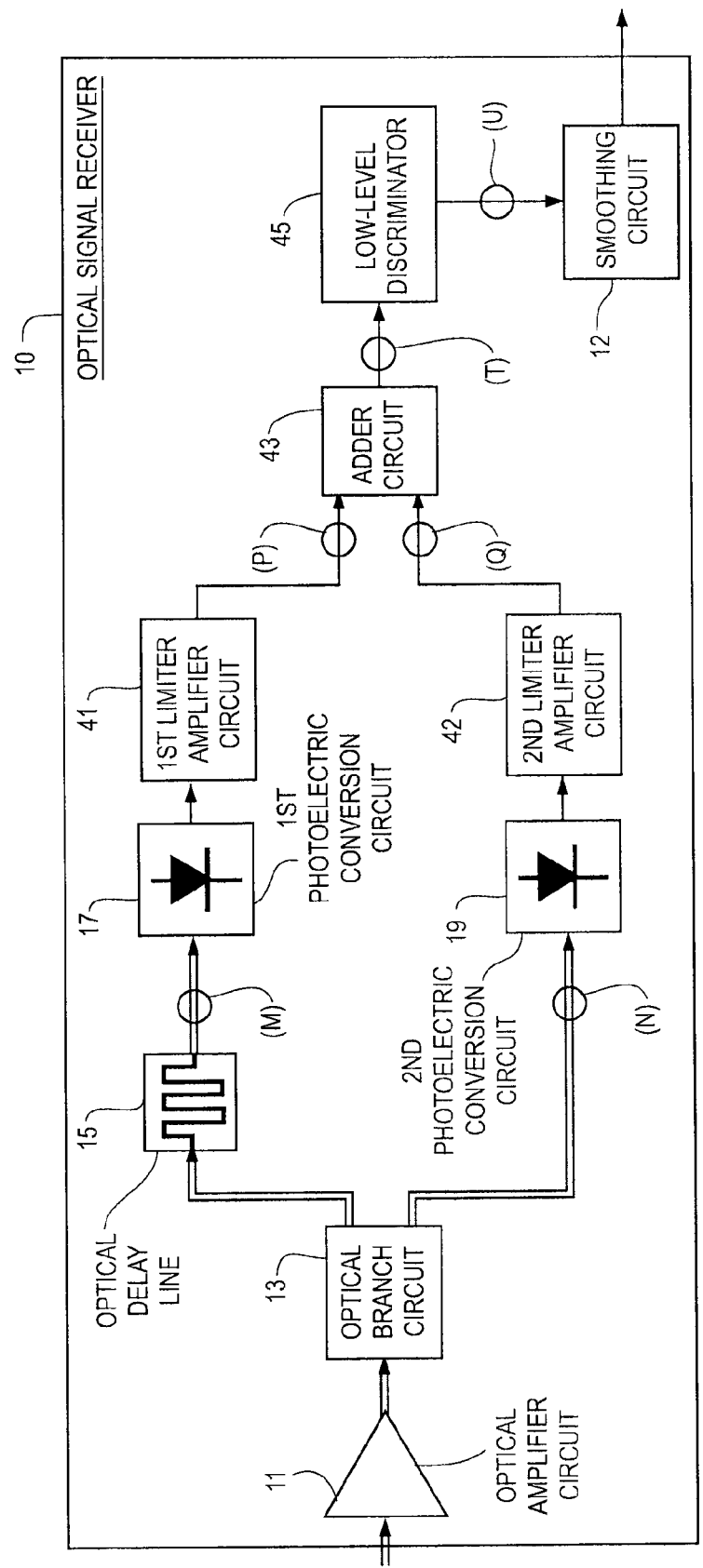
[FIG. 18]

This embodiment is an optical signal receiver for performing delay detection using an optical delay line. FIG. 18 shows the configuration of the optical signal receiver according to this embodiment. The optical signal receiver 10 shown in FIG. 18 comprises the optical amplifier circuit 11, the optical branch circuit 13, the optical delay line-15, the first photoelectric conversion circuit 17, the first limiter amplifier circuit 41, the second photoelectric conversion circuit 19, the second limiter amplifier circuit 42, the adder circuit 43, a low-level discriminator 45, and the smoothing circuit 12. The difference from FIG. 16 explained in Embodiment 3 is a point that the high-level discriminator 44 in FIG. 16 is changed with the low-level discriminator 45.

Since the structural difference from Embodiment 3 is a difference between the high-level discriminator 44 and the low-level discriminator 45, the difference will be referred to. The threshold of the high-level discriminator 44 exists between the level when the optical signal is inputted into both the first photoelectric conversion circuit 17 and the second photoelectric conversion circuit 19 and the level when the optical signal is inputted into either the first photoelectric conversion circuit 17 or the second photoelectric conversion circuit 19. On the other hand, the threshold of the low-level discriminator 45 exists between the level when the optical signal is inputted into either the first photoelectric conversion circuit 17 or the second photoelectric conversion circuit 19 and a level when the optical signal is inputted into neither the first photoelectric conversion circuit 17 nor the second photoelectric conversion circuit 19.

Figure 19:
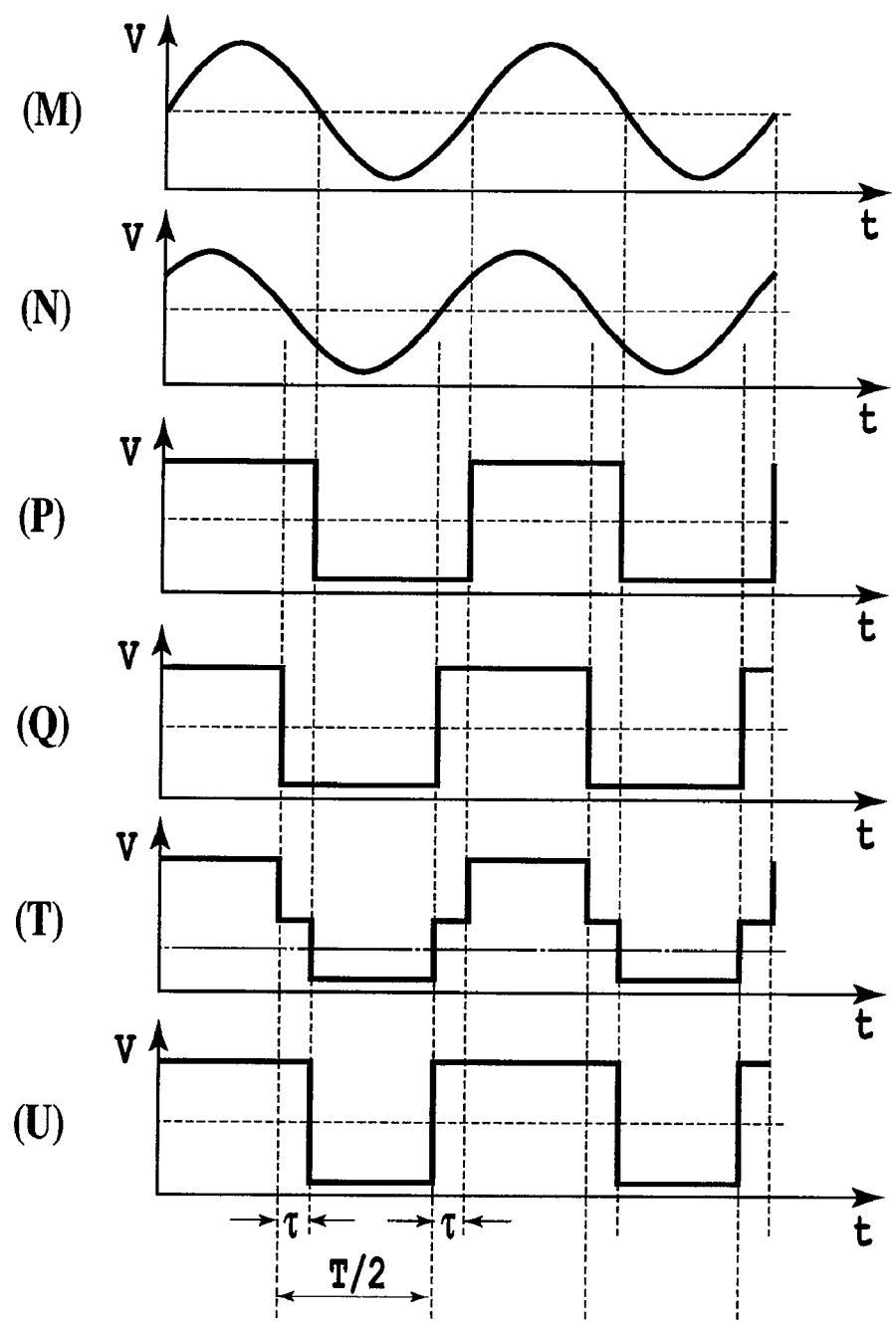
[FIG. 19]

FIG. 19 shows signal waveforms in several points of (M), (N), (P), (Q), (T), and (U) in FIG. 18. (M), (N), (P), (Q), (T), and (U) of FIG. 19 are the signal waveforms in the points of (M), (N), (P), (Q), (T), and (U) in FIG. 18. Hereafter, the frequency demodulation operation will be explained representing the instantaneous frequency of the optical signal inputted into the optical amplifier circuit 11 by f=1/T and representing the delay time of the optical delay line 15 by $\tau$.

The difference from Embodiment 3 is a threshold used for discrimination. The alternate long and short dash line in FIG. 19(T) indicates the threshold. This threshold exists between the level when the optical signal is inputted into either the first photoelectric conversion circuit 17 or the second photoelectric conversion circuit 19 and the level when the optical signal is inputted into neither the first photoelectric conversion circuit 17 nor the second photoelectric conversion circuit 19. As a result, the output voltage Vout smoothed by the smoothing circuit 12 is expressed by the following formula.

$$Vout = Vo \times (T/2+\tau)/T = Vo \times (1/2+\tau/T) = Vo \times (1/2+\tau f) \quad (13)$$

From Formula (13), a frequency demodulation characteristic as shown in FIG. 15 can be achieved. Thus, since the output voltage of the smoothing circuit increases linearly with the frequency of the input optical signal, this optical signal receiver can implement a frequency demodulation function.

As described above, the optical signal receiver of this embodiment can receive and frequency-demodulate an optical signal that is frequency-modulated. Moreover, since the optical delay line does not have phase distortion at high frequencies, the optical signal receiver can realize an excellent frequency demodulation characteristic at high frequencies. Although this embodiment was described using FIG. 18, when the optical signal receiver receives an optical signal with sufficient optical power, the optical amplifier circuit 11 in FIG. 18 can be omitted.

Embodiment 5

Figure 20:
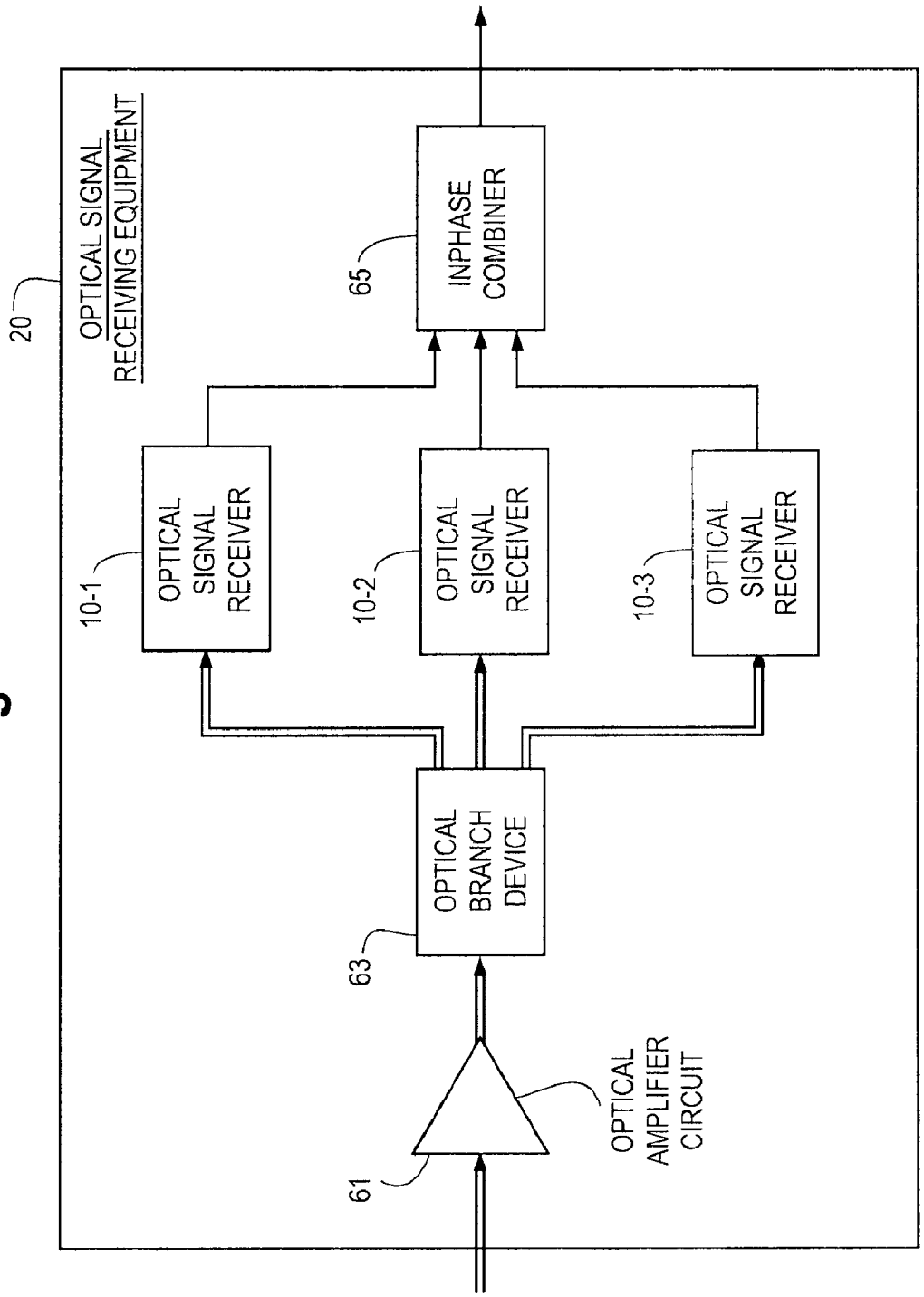
[FIG. 20]

This embodiment is optical signal receiving equipment that improves a noise characteristic using difference in additivity between signal and noise. FIG. 20 shows the optical signal receiving equipment according to this embodiment. Optical signal receiving equipment 20 shown in FIG. 20 comprises an optical amplifier 61, an optical branch device 63, optical signal receivers 10-1, 10-2 and 10-3 that are any of the optical signal receivers according to Embodiments 1 through 4, and an inphase combiner 65.

Referring to FIG. 20, the configuration of the optical signal receiving equipment of this embodiment will be described. The optical signal receiving equipment 20 shown in FIG. 20 has a function of receiving and frequency-demodulating an optical signal that is frequency-modulated. Circuits and their operations of the optical signal receiving equipment 20 will be explained. The optical amplifier 61 amplifies an optical signal inputted thereinto and outputs it. When the optical power of an optical signal inputted into the optical signal receiver to be described later is sufficient, the optical signal may be directly inputted into the optical branch device 63 omitting the optical amplifier 61.

The optical branch device 63 splits an input optical signal into three signals. Although FIG. 20 shows an example of splitting into three, the input optical signal may be split into N signals (N is an integer of two or more). In this case, the N branched optical signals will be inputted into N optical signal receivers. The optical signals inputted into the optical signal receivers 10-1, 10-2, and 10-3 are frequency-demodulated, respectively.

The inphase combiner 65 combines electrical signals that are frequency-demodulated by the optical signal receivers 10-1, 10-2, and 10-3 being in phase with one another. If the electrical signals from the optical signal receivers 10-1, 10-2, and 10-3 are set to be in phase with one another, regarding the combined electrical signal by the inphase combiner 65, signal components are added in terms of voltage whereas noise components are added in terms of electric power.

Representing the signal components of the electrical signals from three optical signal receivers by Vs1, Vs2, and Vs3, respectively, and assuming that they are equal, i.e., Vs1=Vs2=Vs3=Vs, the total sum voltage Vst of the signal components outputted by the inphase combiner 65 is given by $$Vst=Vs1+Vs2+Vs3=3\times Vs. \tag{14}$$

Representing the output impedance of the inphase combiner 65 by R, when only one of the three optical signal receivers inputs a signal into the inphase combiner 65, an electric power Ps1 of the signal component of an electrical signal outputted by the inphase combiner 65 is given by $$Ps1=(Vs)^2/R. \tag{15}$$

When three optical signal receivers input optical signals into the inphase combiner 65, an electric power Pst of the signal component of an electrical signal outputted by the inphase combiner 65 is given by $$Pst=(Vst)^2/R=(3\times Vs)^2/R=9\times(Vs)^2/R. \tag{16}$$

On the other hand, representing the electric powers of noise components outputted from the three optical signal receivers by Pn1, Pn2, and Pn3, respectively, when they are all equal, i.e., Pn1=Pn2=Pn3=Pn, a total sum Pnt of the noise components of the electrical signals outputted by the inphase combiner 65 is given by $$Pnt=Pn1+Pn2+Pn3=3\times Pn. \tag{17}$$

When only one of the three optical signal receivers inputs an optical signal into the inphase combiner 65, the electric power of the noise component of the electrical signal outputted by the inphase combiner 65 is given by $$Pn1=Pn. \tag{18}$$

These formulas indicate that, when the electrical signals from three optical signal receivers are combined being in phase with one another, a power ratio of a signal component of 20×log(3) is obtained as compared with the electrical signal from a single optical signal receiver, but an electric power ratio of a noise component becomes 10×log(3) [dB] in the same comparison; therefore, the signal-to-noise ratio (electric power) at the output of the inphase combiner 65 is improved by 10×log(3) [dB].

In this embodiment, the case of N=3 (i.e., the case of three electrical signals outputted by the three optical signal receivers) was explained. In the case where the number of electrical signals outputted from the optical signal receivers is N (N is an integer of two or more), the signal-to-noise ratio (electric power) can be improved by 10×log(N) [dB] as compared with the case of an electrical signal outputted from a single optical signal receiver.

In addition, regarding the distortion, if the distortion characteristics of electrical signals outputted from N optical signal receivers are inversely distorted, optical signals will cancel out one another in inphase combining, and consequently lower distortion can be achieved as compared with the case of a single optical signal receiver.

Embodiment 6

This embodiment is an optical signal transmission system that uses any of the optical signal receivers and the optical signal receiving equipment according to claims 1 through 5. Referring to FIG. 1, the optical signal transmission system of this embodiment will be described. In this embodiment, the system comprises the optical signal transmitter 80 shown in FIG. 1 and either the optical signal receiver or the optical signal receiving equipment according to Embodiments 1 through 5 that is connected to the optical signal transmitter 80 through the optical fiber transmission path 85.

Multichannel AM picture signals or QAM picture signals that have been frequency-division-multiplexed are inputted into an FM batch conversion circuit 81 of the optical signal transmitter 80 and frequency-modulated. The frequency-modulated electrical signals are allowed to intensity-modulate a light source 82 to effect conversion from the electrical signal to an optical signal. This optical signal is optically amplified in an optical amplification 83 and outputted to the optical transmission path 85. The optical signal from the optical signal transmitter 80 is received and frequency-demodulated by any of the optical signal receiver and the optical signal receiving equipment according to Embodiments 1 through 5 by means of the optical transmission path 85.

Figure 21:
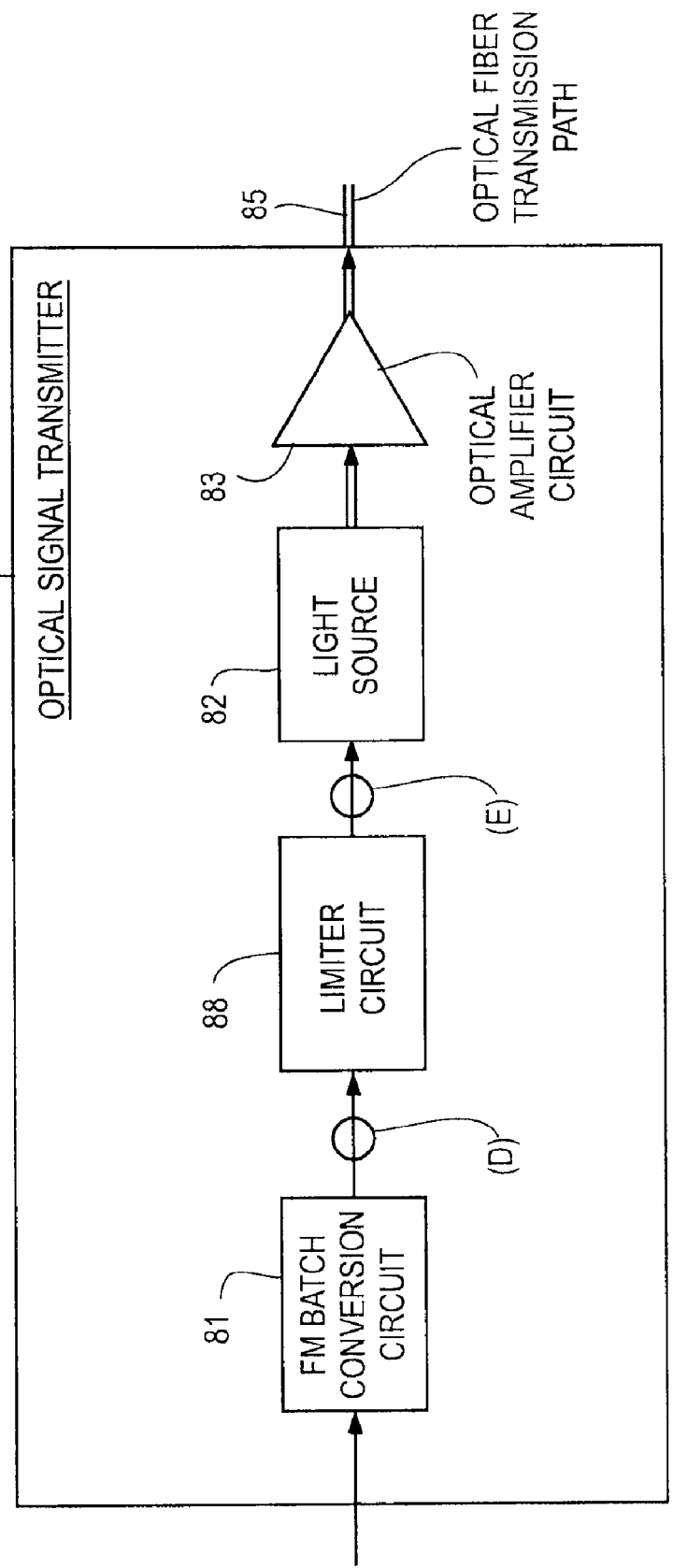
[FIG. 21]

The light source 82 can directly intensity-modulate an output of the FM batch conversion circuit 81 or intensity-modulate the output of the FM batch conversion circuit 81 after it was converted into pulses. FIG. 21 shows the configuration of the optical signal transmitter in the case when the signal is intensity-modulated after being converted into pulses. The optical signal transmitter 80 shown in FIG. 21 comprises the FM batch conversion circuit 81, a limiter circuit 88, the light source 82, and the optical amplifier circuit 83, and outputs an optical signal to the optical transmission path 85.

Figure 22:
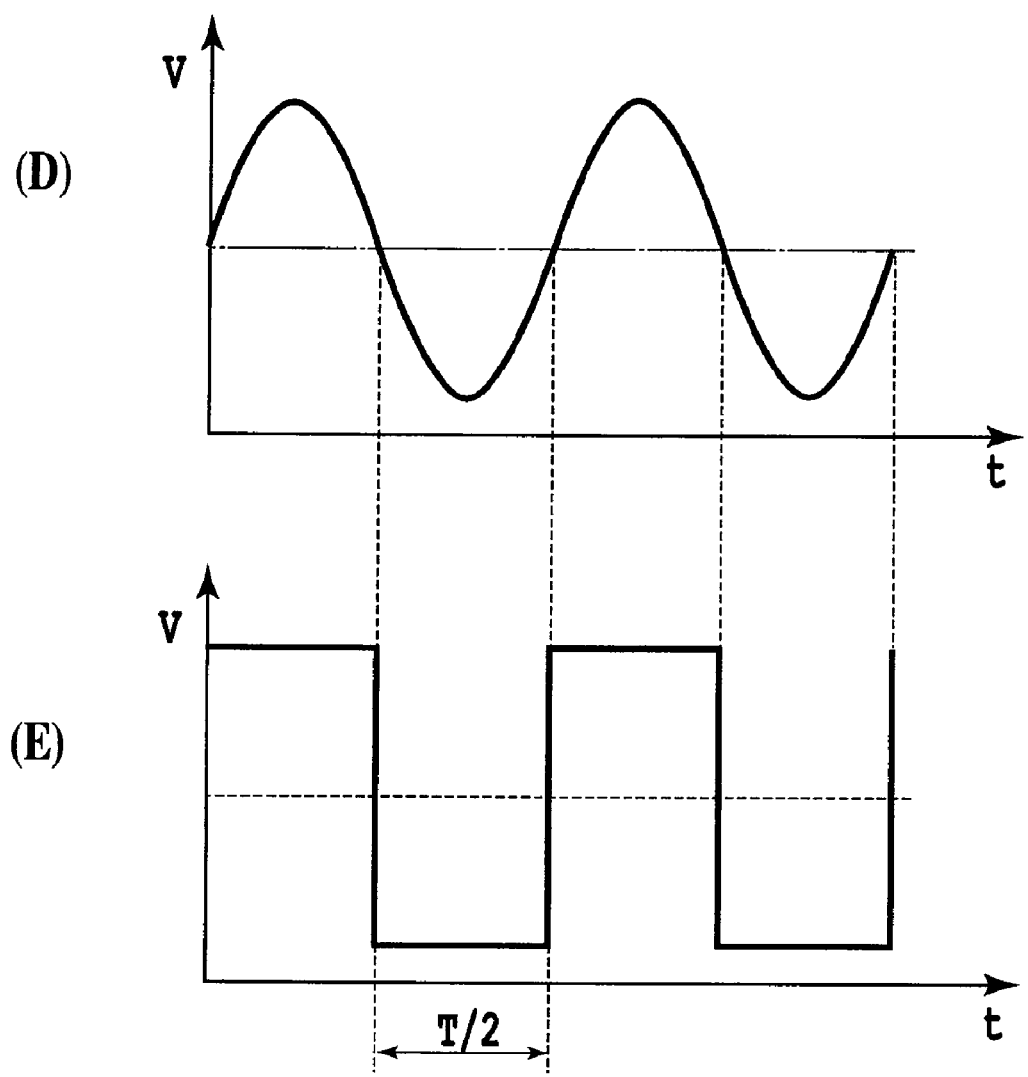
[FIG. 22]

Multichannel AM picture signals or QAM picture signals that have been frequency-division-multiplexed are frequency-modulated by the FM batch conversion circuit 81 of the optical signal transmitter 80. The limiter circuit 88 discriminates whether the electrical signal obtained by frequency modulation is equal to or more than a threshold or less than the threshold and performs a limiting operation, whereby it can convert the electrical signal into pulses by shaping the waveform into a rectangular wave. FIG. 22 shows the signal waveforms in several points of the optical signal transmitter shown in FIG. 21. FIGS. 22(D) and (E) are the signal waveforms in points of (D) and (E) in FIG. 21. The alternate long and short dash line in FIG. 22(D) is a threshold of the limiter circuit. If the limiter circuit performs a limiting operation on the frequency-modulated electrical signal, shown in FIG. 22(D), using a threshold of the limiter circuit, the electrical signal is shaped into a rectangular wave. Even when the FM signal thus converted into pulses is allowed to intensity-modulate the light source 82, the signal can be frequency-demodulated in an optical signal receiver or optical signal receiving equipment.

Figure 7:
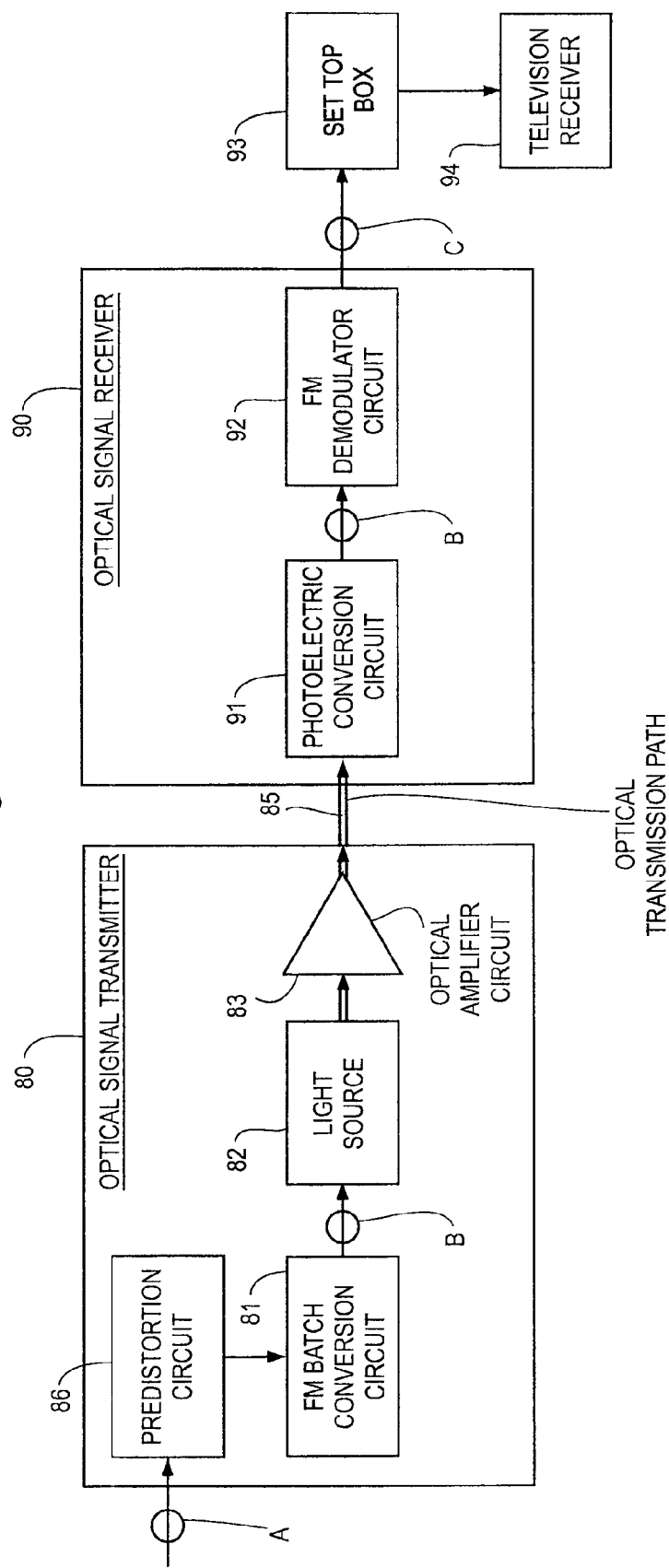
[FIG. 7]
Figure 8:
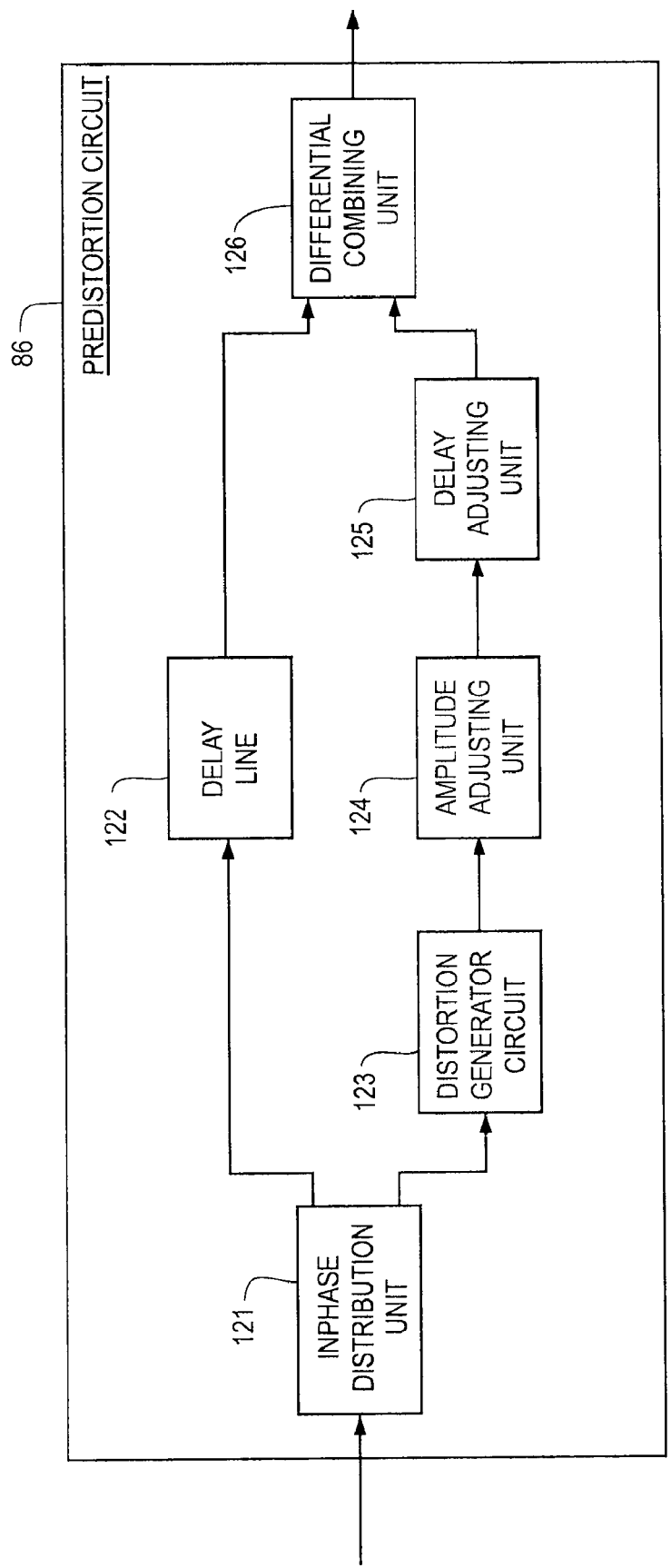
[FIG. 8]
Figure 9:
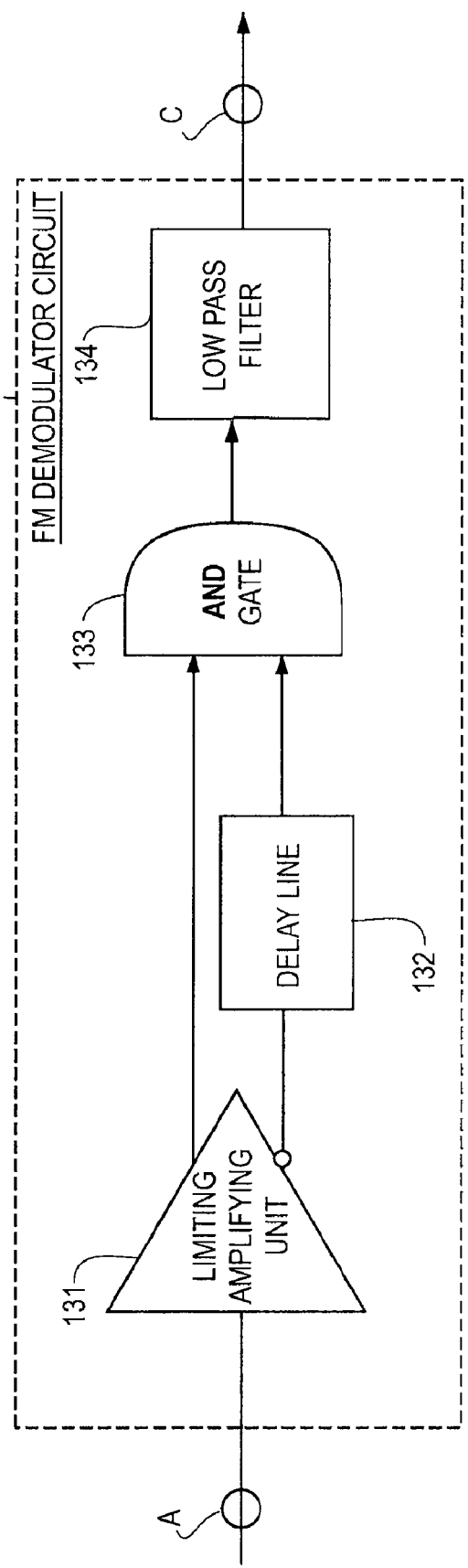
[FIG. 9]

Moreover, if the optical signal transmitter 80 equipped with the predistortion circuit 86, as shown in FIG. 7, is used, distortion generated in the optical signal transmitter, the optical signal receiver, and the optical signal receiving equipment can be reduced. That is, when the optical signal transmitter 80 in FIG. 7 is connected with any of the optical signal receivers and the optical signal receiving equipment according to Embodiments 1 through 5 by means of an optical transmission path, it becomes possible to transmit picture signals with less distortion.

INDUSTRIAL APPLICABILITY

The optical signal receiver and the optical signal receiving equipment of this invention can be applied to an optical signal transmission system that performs frequency modulation on various signals as well as picture signals and transmits/receives these signals. This optical signal transmission system can be applied not only to the case where a network configuration of optical transmission paths is of an SS (Single Star)

topology but also to the case where a network configuration of optical transmission paths is of a PDS (Passive Double Star) topology.

The invention claimed is:

1. An optical signal receiver for receiving and frequency-demodulating an optical signal, comprising:
an optical branch circuit for splitting an input optical signal into a first optical signal and a second optical signal;
an optical delay line for delaying the first optical signal;
a first photoelectric conversion circuit for converting the optical signal from the optical delay line into a first electrical signal;
a second photoelectric conversion circuit for converting the second optical signal into a second electrical signal;
a rectangular-wave forming means that outputs a single rectangular-wave signal using the first electrical signal from the first photoelectric conversion circuit and the second electrical signal from the second photoelectric conversion circuit as inputs; and
a smoothing circuit for smoothing the rectangular-wave signal from the rectangular-wave forming means, wherein
the rectangular-wave forming means comprises:
a first limiter amplifier that limits and amplifies the first electrical signal from the first photoelectric conversion circuit and outputs a first binary signal;
a second limiter amplifier that limits and amplifies the second electrical signal from the second photoelectric conversion circuit and outputs a second binary signal;
an adder circuit that adds the first binary signal from the first limiter amplifier and the second binary signal of the second limiter amplifier and outputs a ternary signal; and
a high level discriminator that discriminates the level of the ternary signal from the adder circuit by comparing its magnitude with a threshold existing between a level when the optical signal is inputted into both the first photoelectric conversion circuit and the second photoelectric conversion circuit and a level when the optical signal is inputted into either the first photoelectric conversion circuit or the second photoelectric conversion circuit and outputs the single rectangular-wave signal.

2. An optical signal receiver for receiving and frequency-demodulating an optical signal, comprising:
an optical branch circuit for splitting an input optical signal into a first optical signal and a second optical signal;
an optical delay line for delaying the first optical signal;
a first photoelectric conversion circuit for converting the optical signal from the optical delay line into a first electrical signal;
a second photoelectric conversion circuit for converting the second optical signal into a second electrical signal;
a rectangular-wave forming means that outputs a single rectangular-wave signal using the first electrical signal from the first photoelectric conversion circuit and the second electrical signal from the second photoelectric conversion circuit as inputs; and
a smoothing circuit for smoothing the rectangular-wave signal from the rectangular-wave forming means, wherein
the rectangular-wave forming means has comprises:
a first limiter amplifier that limits and amplifies the first electrical signal from the first photoelectric conversion circuit and outputs a first binary signal;
a second limiter amplifier that limits and amplifies the second electrical signal from the second photoelectric conversion circuit and outputs a second binary signal;
an adder circuit that adds the first binary signal from the first limiter amplifier and the second binary signal of the second limiter amplifier and outputs a ternary signal; and
a low level discriminator that discriminates the level of the ternary signal from the adder circuit by comparing its magnitude with a threshold existing between a level when the optical signal inputted into both the first photoelectric conversion circuit and the second photoelectric conversion circuit and a level when the optical signal is inputted into neither the first photoelectric conversion circuit nor the second photoelectric conversion circuit and outputs the single rectangular signal.

3. An optical signal receiving equipment for receiving and frequency-demodulating an optical signal, comprising:
(1) an optical branch device that splits an input optical signal into N signals, and
(2) N optical signal receivers,
where N is an integer of two or more, and
where each of the optical signal receivers comprises:
an optical branch circuit that splits the optical signal from the optical branch device into a first optical signal and a second optical signal;
an optical delay line for delaying the first optical signal;
a first photoelectric conversion circuit for converting the optical signal from the optical delay line into a first electrical signal;
a second photoelectric conversion circuit for converting the second optical signal into a second electrical signal;
rectangular-wave forming means for forming a single rectangular-wave signal using the first electrical signal from the first photoelectric conversion circuit and the second electrical signal from the second photoelectric conversion circuit as inputs; and
a smoothing circuit for smoothing the rectangular-wave signal from the rectangular-wave forming means; and
(3) an inphase combiner that combines N smoothed rectangular-wave signals outputted from the N optical signal receivers, respectively, being in phase with one another,
wherein the rectangular-wave forming means of the optical signal receiver comprises:
a first limiter amplifier that limits and amplifies the first electrical signal from the first photoelectric conversion circuit and outputs a first binary signal;
a second limiter amplifier that limits and amplifies the second electrical signal from the second photoelectric conversion circuit and outputs a second binary signal;
an adder circuit that adds the first binary signal from the first limiter amplifier and the second binary signal from the second limiter amplifier and outputs a ternary signal; and
a high level discriminator that discriminates the level of the ternary signal from the adder circuit by comparing its magnitude with a threshold existing between a level when the optical signal is inputted into both the first photoelectric conversion circuit and the second photoelectric conversion circuit and a level when the optical signal is inputted into either the first photoelectric conversion circuit or the second photoelectric conversion circuit and outputs the single rectangular signal.

4. An optical signal receiving equipment for receiving and frequency-demodulating an optical signal, comprising:
(1) an optical branch device that splits an input optical signal into N signals; and
(2) N optical signal receivers,
where N is an integer of two or more, and
where each of the optical signal receivers comprises:
an optical branch circuit that splits the optical signal from the optical branch device into a first optical signal and a second optical signal;

an optical delay line for delaying the first optical signal;
a first photoelectric conversion circuit for converting the optical signal from the optical delay line into a first electrical signal;
a second photoelectric conversion circuit for converting the second optical signal into a second electrical signal;
rectangular-wave forming means for forming a single rectangular-wave signal using the first electrical signal from the first photoelectric conversion circuit and the second electrical signal from the second photoelectric conversion circuit as inputs; and
a smoothing circuit for smoothing the rectangular-wave signal from the rectangular-wave forming means; and
(3) an inphase combiner that combines the N smoothed rectangular-wave signals outputted from the N optical signal receivers, respectively, being in phase with one another,
wherein the rectangular-wave forming means of the optical signal receiver comprises:
a first limiter amplifier that limits and amplifies the first electrical signal from the first photoelectric conversion circuit and outputs a first binary signal;
a second limiter amplifier that limits and amplifies the second electrical signal from the second photoelectric conversion circuit and outputs a second binary signal;
an adder circuit that adds the first binary signal from the first limiter amplifier and the second binary signal from the second limiter amplifier and outputs a ternary signal; and
a low level discriminator that discriminates the level of the ternary signal from the adder circuit by comparing its magnitude with a threshold existing between a level when the optical signal is inputted into either the first photoelectric conversion circuit or the second photoelectric conversion circuit and a level when the optical signal is inputted into neither the first photoelectric conversion circuit nor the second photoelectric conversion circuit and outputs the single rectangular signal.

5. An optical signal transmission system using an FM batch conversion method, comprising:
(1) an optical signal transmitter equipped with an FM batch conversion circuit; and
(2) an optical signal receiver having:
an optical branch circuit that is connected with the optical signal transmitter through an optical transmission path and splits an optical signal from the optical signal transmitter into a first optical signal and a second optical signal;
an optical delay line for delaying the first optical signal;
a first photoelectric conversion circuit for converting the optical signal from the optical delay line into a first electrical signal;
a second photoelectric conversion circuit for converting the second optical signal into a second electrical signal;
rectangular-wave forming means for outputting a single rectangular-wave signal using the first electrical signal from the first photoelectric conversion circuit and the second electrical signal from the second photoelectric conversion circuit as inputs and outputs a single rectangular-wave signal; and
a smoothing circuit for smoothing the rectangular-wave signal from the rectangular-wave forming means,
the rectangular-wave forming means of the optical signal receiver comprising:
a first limiter amplifier that limits and amplifies the first electrical signal from the photoelectric conversion circuit and outputs a first binary signal;
a second limiter amplifier that limits and amplifies the second electrical signal from the photoelectric conversion circuit and outputs a second binary signal;
an adder circuit that adds the first binary signal from the first limiter amplifier and the second binary signal from the second limiter amplifier and outputs a ternary signal; and
a high level discriminator that discriminates the level of the ternary signal from the adder circuit by comparing its magnitude with a threshold existing between a level when the optical signal is inputted into both the first photoelectric conversion circuit and the second photoelectric conversion circuit and a level when the optical signal is inputted into either the first photoelectric conversion circuit or the second photoelectric conversion circuit and outputs the single rectangular signal.

6. The optical signal transmission system according to claim 5, wherein
the optical signal transmitter further comprises a predistortion circuit that adds beforehand a distortion inverse to a distortion that the FM batch conversion circuit generates.

7. An optical signal transmission system using an FM batch conversion method, comprising:
(1) an optical signal transmitter equipped with an FM batch conversion circuit; and
(2) an optical signal receiver having:
an optical branch circuit that is connected with the optical signal transmitter through an optical transmission path and splits an optical signal from the optical signal transmitter into a first optical signal and a second optical signal;
an optical delay line for delaying the first optical signal;
a first photoelectric conversion circuit for converting the optical signal from the optical delay line into a first electrical signal;
a second photoelectric conversion circuit for converting the second optical signal into a second electrical signal;
rectangular-wave forming means for outputting a single rectangular-wave signal using the first electrical signal from the first photoelectric conversion circuit and the second electrical signal from the second photoelectric conversion circuit as inputs and outputs a single rectangular-wave signal; and
a smoothing circuit for smoothing the rectangular-wave signal from the rectangular-wave forming means;
the rectangular-wave forming means of the optical signal receiver comprising:
a first limiter amplifier that limits and amplifies the first electrical signal from the first photoelectric conversion circuit and outputs a first binary signal;
a second limiter amplifier that limits and amplifies the second electrical signal from the second photoelectric conversion circuit and outputs a second binary signal;
an adder circuit that adds the binary signal from the first limiter amplifier and the binary signal from the limiter amplifier and outputs a ternary value signal; and
a low level discriminator that discriminates the level of the ternary signal from the adder circuit by comparing its magnitude with a threshold existing between a level when the optical signal is inputted into either the first photoelectric conversion circuit or the second photoelectric conversion circuit and a level when the optical signal is inputted into neither the first photoelectric conversion circuit nor the second photoelectric conversion circuit and outputs the single rectangular signal.

8. The optical signal transmission system according to claim 7, wherein the optical signal transmitter further comprises a predistortion circuit that adds beforehand a distortion inverse to a distortion that the FM batch conversion circuit generates.

* * * * *